US010229697B2

(12) United States Patent
Bastyr et al.

(10) Patent No.: US 10,229,697 B2
(45) Date of Patent: Mar. 12, 2019

(54) APPARATUS AND METHOD FOR BEAMFORMING TO OBTAIN VOICE AND NOISE SIGNALS

(71) Applicant: Google Technology Holdings LLC, Mountain View, CA (US)

(72) Inventors: Kevin J. Bastyr, Milwaukee, WI (US); Giles T Davis, Mundelein, IL (US); Plamen A Ivanov, Schaumburg, IL (US); Rivanaldo S Oliveira, Grayslake, IL (US); Tenkasi V Ramabadran, Oswego, IL (US); Snehitha Singaraju, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 223 days.

(21) Appl. No.: 13/955,723

(22) Filed: Jul. 31, 2013

(65) Prior Publication Data

US 2014/0278394 A1 Sep. 18, 2014

Related U.S. Application Data

(60) Provisional application No. 61/827,799, filed on May 28, 2013, provisional application No. 61/776,793, (Continued)

(51) Int. Cl.
*G10L 15/20* (2006.01)
*G10L 21/0208* (2013.01)
(Continued)

(52) U.S. Cl.
CPC .......... *G10L 21/0208* (2013.01); *G10L 15/20* (2013.01); *H04R 3/005* (2013.01); (Continued)

(58) Field of Classification Search
CPC . G10L 2021/02165; G10L 2021/02166; G10L 21/0208
See application file for complete search history.

(56) References Cited

U.S. PATENT DOCUMENTS 4,612,669 A 9/1986 Nossen
4,631,543 A 12/1986 Brodeur
(Continued)

FOREIGN PATENT DOCUMENTS

CN 1762137 4/2006
CN 1859656 11/2006
(Continued)

OTHER PUBLICATIONS

US 8,224,317, 08/2012, Knoppert et al. (withdrawn)
(Continued)

*Primary Examiner* — Michael N Opsasnick
(74) *Attorney, Agent, or Firm* — Colby Nipper

(57) ABSTRACT

One method of operation includes beamforming a plurality of microphone outputs to obtain a plurality of virtual microphone audio channels. Each virtual microphone audio channel corresponds to a beamform. The virtual microphone audio channels include at least one voice channel and at least one noise channel. The method includes performing voice activity detection on the at least one voice channel and adjusting a corresponding voice beamform until voice activity detection indicates that voice is present on the at least one voice channel. Another method beamforms the plurality of microphone outputs to obtain a plurality of virtual microphone audio channels, where each virtual microphone audio channel corresponds to a beamform, and with at least one voice channel and at least one noise channel. The method performs voice recognition on the at least one voice channel
(Continued)

and adjusts the corresponding voice beamform to improve a voice recognition confidence metric.

20 Claims, 5 Drawing Sheets

Related U.S. Application Data filed on Mar. 12, 2013, provisional application No. 61/798,097, filed on Mar. 15, 2013.

(51) Int. Cl.
*H04R 3/00* (2006.01)
*G10L 25/78* (2013.01)
*G10L 15/01* (2013.01)
*G10L 21/0216* (2013.01)

(52) U.S. Cl.
CPC .............. *G10L 15/01* (2013.01); *G10L 25/78* (2013.01); *G10L 2021/02165* (2013.01); *G10L 2021/02166* (2013.01)

(56) References Cited

U.S. PATENT DOCUMENTS

| | | | |
|---|---|---|---|
| 4,754,285 A | 6/1988 | Robitaille | |
| 4,881,123 A | 11/1989 | Chapple | |
| 4,884,252 A | 11/1989 | Teodoridis et al. | |
| 4,953,197 A | 8/1990 | Kaewell, Jr. et al. | |
| 5,267,234 A | 11/1993 | Harrison | |
| 5,459,440 A | 10/1995 | Claridge et al. | |
| 5,469,307 A | 11/1995 | Yamada et al. | |
| 5,564,086 A | 10/1996 | Cygan et al. | |
| 5,634,200 A | 5/1997 | Kitakubo et al. | |
| 5,699,319 A | 12/1997 | Skrivervik | |
| 5,757,326 A | 5/1998 | Koyama et al. | |
| 5,804,944 A | 9/1998 | Alberkrack et al. | |
| 5,862,458 A | 1/1999 | Ishii | |
| 6,144,186 A | 11/2000 | Thadiwe et al. | |
| 6,284,849 B1 | 9/2001 | Almquist et al. | |
| 6,339,758 B1* | 1/2002 | Kanazawa ............... G10L 21/02 381/94.3 | |
| 6,362,690 B1 | 3/2002 | Tichauer | |
| 6,373,439 B1 | 4/2002 | Zurcher et al. | |
| 6,400,702 B1 | 6/2002 | Meier | |
| 6,560,444 B1 | 5/2003 | Imberg | |
| 6,594,508 B1 | 7/2003 | Ketonen | |
| 6,674,291 B1 | 6/2004 | Barber et al. | |
| 6,879,942 B1 | 4/2005 | Nagase et al. | |
| 6,927,555 B2 | 8/2005 | Johnson | |
| 6,937,980 B2 | 8/2005 | Krasny et al. | |
| 7,019,702 B2 | 3/2006 | Henriet et al. | |
| 7,142,884 B2 | 11/2006 | Hagn | |
| 7,199,754 B2 | 4/2007 | Krumm et al. | |
| 7,202,734 B1 | 4/2007 | Raab | |
| 7,202,815 B2 | 4/2007 | Swope et al. | |
| 7,224,992 B2 | 5/2007 | Patino et al. | |
| 7,254,420 B1 | 8/2007 | Klein | |
| 7,260,366 B2 | 8/2007 | Lee et al. | |
| 7,359,504 B1* | 4/2008 | Reuss .................. H04M 9/082 379/406.01 | |
| 7,400,907 B2 | 7/2008 | Jin et al. | |
| 7,433,661 B2 | 10/2008 | Kogiantis et al. | |
| 7,436,896 B2 | 10/2008 | Hottinen et al. | |
| 7,440,731 B2 | 10/2008 | Staudinger et al. | |
| 7,471,963 B2 | 12/2008 | Kim et al. | |
| 7,486,931 B2 | 2/2009 | Cho et al. | |
| 7,504,833 B1 | 3/2009 | Sequine | |
| 7,599,420 B2 | 10/2009 | Forenza et al. | |
| 7,620,432 B2 | 11/2009 | Willins et al. | |
| D606,958 S | 12/2009 | Knoppert et al. | |
| 7,639,660 B2 | 12/2009 | Kim et al. | |
| 7,643,642 B2 | 1/2010 | Patino et al. | |
| 7,649,831 B2 | 1/2010 | Van Rensburg et al. | |
| 7,664,200 B2 | 2/2010 | Ariyavisitakul et al. | |
| 7,746,943 B2 | 6/2010 | Yamaura | |
| 7,747,001 B2* | 6/2010 | Kellermann .......... H04M 9/082 379/406.01 |
| 7,760,681 B1 | 7/2010 | Chhabra | |
| 7,773,535 B2 | 8/2010 | Vook et al. | |
| 7,773,685 B2 | 8/2010 | Tirkkonen et al. | |
| 7,813,696 B2 | 10/2010 | Kim | |
| 7,822,140 B2 | 10/2010 | Catreux et al. | |
| 7,835,711 B2 | 11/2010 | McFarland | |
| 7,839,201 B2 | 11/2010 | Jacobson | |
| 7,864,969 B1* | 1/2011 | Ma ........................ H04R 3/005 381/71.11 |
| 7,885,211 B2 | 2/2011 | Shen et al. | |
| 7,936,237 B2 | 5/2011 | Park et al. | |
| 7,940,740 B2 | 5/2011 | Krishnamurthy et al. | |
| 7,942,936 B2 | 5/2011 | Golden | |
| 7,945,229 B2 | 5/2011 | Wilson et al. | |
| 7,983,722 B2 | 7/2011 | Lowles et al. | |
| 8,014,455 B2 | 9/2011 | Kim et al. | |
| 8,072,285 B2 | 12/2011 | Spears et al. | |
| 8,094,011 B2 | 1/2012 | Faris et al. | |
| 8,095,081 B2 | 1/2012 | Vance | |
| 8,098,120 B2 | 1/2012 | Steeneken et al. | |
| 8,155,683 B2 | 4/2012 | Buckley et al. | |
| 8,204,446 B2 | 6/2012 | Scheer et al. | |
| 8,219,336 B2 | 7/2012 | Hoebel et al. | |
| 8,219,337 B2 | 7/2012 | Hoebel et al. | |
| 8,232,685 B2 | 7/2012 | Perper et al. | |
| 8,233,851 B2 | 7/2012 | Jeon et al. | |
| 8,259,431 B2 | 9/2012 | Katta | |
| 8,275,327 B2 | 9/2012 | Yi et al. | |
| 8,280,038 B2 | 10/2012 | Johnson et al. | |
| 8,280,323 B2 | 10/2012 | Thompson | |
| 8,284,849 B2 | 10/2012 | Lee et al. | |
| 8,302,183 B2 | 10/2012 | Sood | |
| 8,319,393 B2 | 11/2012 | DeReus | |
| 8,373,596 B1 | 2/2013 | Kimball et al. | |
| 8,374,633 B2 | 2/2013 | Frank et al. | |
| 8,384,695 B2 | 2/2013 | Lee et al. | |
| 8,428,022 B2 | 4/2013 | Frank et al. | |
| 8,460,961 B2 | 6/2013 | Guo et al. | |
| 8,483,707 B2 | 7/2013 | Krishnamurthy et al. | |
| 8,509,338 B2 | 8/2013 | Sayana et al. | |
| 8,542,776 B2 | 9/2013 | Kim et al. | |
| 8,588,426 B2 | 11/2013 | Xin et al. | |
| 8,594,584 B2 | 11/2013 | Greene et al. | |
| 8,606,200 B2 | 12/2013 | Ripley et al. | |
| 8,611,829 B2 | 12/2013 | Alberth et al. | |
| 8,620,348 B2 | 12/2013 | Shrivastava et al. | |
| 8,626,083 B2 | 1/2014 | Greene et al. | |
| 8,712,340 B2 | 4/2014 | Hoirup et al. | |
| 8,712,355 B2 | 4/2014 | Black et al. | |
| 8,731,496 B2 | 5/2014 | Drogi et al. | |
| 8,761,296 B2 | 6/2014 | Zhang et al. | |
| 8,767,722 B2 | 7/2014 | Kamble et al. | |
| 8,909,173 B2 | 12/2014 | Harmke | |
| 8,989,747 B2 | 3/2015 | Padden et al. | |
| 9,002,354 B2 | 4/2015 | Krishnamurthy et al. | |
| 9,031,523 B2 | 5/2015 | Anderson | |
| 9,197,255 B2 | 11/2015 | Pourkhaatoun et al. | |
| 9,203,489 B2 | 12/2015 | Sayana et al. | |
| 9,215,659 B2 | 12/2015 | Asrani et al. | |
| 9,241,050 B1 | 1/2016 | Asrani et al. | |
| 9,298,303 B2 | 3/2016 | Wagner et al. | |
| 9,301,177 B2 | 3/2016 | Ballantyne et al. | |
| 9,326,320 B2 | 4/2016 | Hong et al. | |
| 9,344,837 B2 | 5/2016 | Russell et al. | |
| 9,386,542 B2 | 7/2016 | Russell et al. | |
| 9,401,750 B2 | 7/2016 | Sayana et al. | |
| 9,413,409 B2 | 8/2016 | Black et al. | |
| 9,478,847 B2 | 10/2016 | Russell et al. | |
| 9,491,007 B2 | 11/2016 | Black et al. | |
| 9,549,290 B2 | 1/2017 | Smith | |
| 9,591,508 B2 | 3/2017 | Halasz et al. | |
| 9,813,262 B2 | 11/2017 | Klomsdorf et al. | |
| 9,979,531 B2 | 5/2018 | Schwent et al. | |
| 10,020,963 B2 | 7/2018 | Klomsdorf et al. | |
| 2002/0037742 A1 | 3/2002 | Enderlein et al. | |

(56) References Cited

U.S. PATENT DOCUMENTS

| | | | |
|---|---|---|---|
| 2002/0057751 A1 | 5/2002 | Jagger et al. | |
| 2002/0090974 A1 | 7/2002 | Hagn | |
| 2002/0138254 A1* | 9/2002 | Isaka | G10L 21/02 |
| | | | 704/208 |
| 2002/0149351 A1 | 10/2002 | Kanekawa et al. | |
| 2002/0193130 A1 | 12/2002 | Yang et al. | |
| 2003/0050018 A1 | 3/2003 | Weissman et al. | |
| 2003/0143961 A1 | 7/2003 | Humphreys et al. | |
| 2003/0161485 A1 | 8/2003 | Smith | |
| 2003/0222819 A1 | 12/2003 | Karr et al. | |
| 2004/0051583 A1 | 3/2004 | Hellberg | |
| 2004/0052314 A1 | 3/2004 | Copeland | |
| 2004/0052317 A1 | 3/2004 | Copeland | |
| 2004/0057530 A1 | 3/2004 | Tarokh et al. | |
| 2004/0063439 A1 | 4/2004 | Glazko et al. | |
| 2004/0082356 A1 | 4/2004 | Walton et al. | |
| 2004/0106428 A1 | 6/2004 | Shoji | |
| 2004/0148333 A1 | 7/2004 | Manion et al. | |
| 2004/0176125 A1 | 9/2004 | Lee | |
| 2004/0178912 A1 | 9/2004 | Smith et al. | |
| 2004/0192398 A1 | 9/2004 | Zhu | |
| 2004/0198392 A1 | 10/2004 | Harvey et al. | |
| 2004/0235433 A1 | 11/2004 | Hugl et al. | |
| 2004/0240575 A1 | 12/2004 | Rainbolt | |
| 2004/0246048 A1 | 12/2004 | Leyonhjelm et al. | |
| 2005/0037733 A1 | 2/2005 | Coleman et al. | |
| 2005/0041018 A1 | 2/2005 | Philipp | |
| 2005/0049864 A1* | 3/2005 | Kaltenmeier | G10L 15/20 |
| | | | 704/233 |
| 2005/0075123 A1 | 4/2005 | Jin et al. | |
| 2005/0085195 A1 | 4/2005 | Tong et al. | |
| 2005/0124393 A1 | 6/2005 | Nuovo et al. | |
| 2005/0134456 A1 | 6/2005 | Niu et al. | |
| 2005/0135324 A1 | 6/2005 | Kim et al. | |
| 2005/0136845 A1 | 6/2005 | Masuoka et al. | |
| 2005/0208952 A1 | 9/2005 | Dietrich et al. | |
| 2005/0227640 A1 | 10/2005 | Haque et al. | |
| 2005/0250532 A1 | 11/2005 | Hwang et al. | |
| 2006/0019677 A1 | 1/2006 | Teague et al. | |
| 2006/0052131 A1 | 3/2006 | Ichihara | |
| 2006/0067277 A1 | 3/2006 | Thomas et al. | |
| 2006/0077952 A1 | 4/2006 | Kubsch et al. | |
| 2006/0099940 A1 | 5/2006 | Pfleging et al. | |
| 2006/0103635 A1 | 5/2006 | Park | |
| 2006/0181453 A1 | 8/2006 | King et al. | |
| 2006/0194593 A1 | 8/2006 | Drabeck et al. | |
| 2006/0207806 A1 | 9/2006 | Philipp | |
| 2006/0209754 A1 | 9/2006 | Ji et al. | |
| 2006/0215618 A1 | 9/2006 | Soliman et al. | |
| 2006/0240827 A1 | 10/2006 | Dunn | |
| 2006/0245601 A1* | 11/2006 | Michaud | G01S 5/22 |
| | | | 381/92 |
| 2006/0256887 A1 | 11/2006 | Kwon et al. | |
| 2006/0280261 A1 | 12/2006 | Prikhodko et al. | |
| 2006/0291393 A1 | 12/2006 | Teague et al. | |
| 2006/0292990 A1 | 12/2006 | Karabinis et al. | |
| 2007/0004344 A1 | 1/2007 | DeGroot et al. | |
| 2007/0008108 A1 | 1/2007 | Schurig et al. | |
| 2007/0026838 A1 | 2/2007 | Staudinger et al. | |
| 2007/0042714 A1 | 2/2007 | Ayed | |
| 2007/0049280 A1 | 3/2007 | Sambhwani et al. | |
| 2007/0069735 A1 | 3/2007 | Graf et al. | |
| 2007/0091004 A1 | 4/2007 | Puuri | |
| 2007/0093281 A1 | 4/2007 | Park et al. | |
| 2007/0133462 A1 | 6/2007 | Guey | |
| 2007/0153743 A1 | 7/2007 | Mukkavilli et al. | |
| 2007/0197180 A1 | 8/2007 | McKinzie et al. | |
| 2007/0200766 A1 | 8/2007 | McKinzie et al. | |
| 2007/0201657 A1 | 9/2007 | McBeath et al. | |
| 2007/0211813 A1 | 9/2007 | Talwar et al. | |
| 2007/0222629 A1 | 9/2007 | Yoneyama | |
| 2007/0223422 A1 | 9/2007 | Kim et al. | |
| 2007/0232370 A1 | 10/2007 | Kim | |
| 2007/0238425 A1 | 10/2007 | McFarland | |
| 2007/0238496 A1 | 10/2007 | Chung et al. | |
| 2007/0243894 A1 | 10/2007 | Das et al. | |
| 2007/0255558 A1 | 11/2007 | Yasunaga et al. | |
| 2007/0280160 A1 | 12/2007 | Kim et al. | |
| 2007/0285326 A1 | 12/2007 | McKinzie | |
| 2008/0001915 A1 | 1/2008 | Pihlaja et al. | |
| 2008/0002735 A1 | 1/2008 | Poirier et al. | |
| 2008/0014960 A1 | 1/2008 | Chou | |
| 2008/0026710 A1 | 1/2008 | Buckley | |
| 2008/0059188 A1* | 3/2008 | Konopka | G10L 15/22 |
| | | | 704/257 |
| 2008/0080449 A1 | 4/2008 | Huang et al. | |
| 2008/0089312 A1 | 4/2008 | Malladi | |
| 2008/0095109 A1 | 4/2008 | Malladi et al. | |
| 2008/0108310 A1 | 5/2008 | Tong et al. | |
| 2008/0111714 A1 | 5/2008 | Kremin | |
| 2008/0117886 A1 | 5/2008 | Kim | |
| 2008/0130626 A1 | 6/2008 | Ventola et al. | |
| 2008/0132247 A1 | 6/2008 | Anderson | |
| 2008/0133462 A1 | 6/2008 | Aylward et al. | |
| 2008/0146289 A1 | 6/2008 | Korneluk et al. | |
| 2008/0157893 A1 | 7/2008 | Krah | |
| 2008/0159239 A1 | 7/2008 | Odlyzko et al. | |
| 2008/0165876 A1 | 7/2008 | Suh et al. | |
| 2008/0167040 A1 | 7/2008 | Khandekar et al. | |
| 2008/0167073 A1 | 7/2008 | Hobson et al. | |
| 2008/0170602 A1 | 7/2008 | Guey | |
| 2008/0170608 A1 | 7/2008 | Guey | |
| 2008/0186105 A1 | 8/2008 | Scuderi et al. | |
| 2008/0192683 A1 | 8/2008 | Han et al. | |
| 2008/0212520 A1 | 9/2008 | Chen et al. | |
| 2008/0225693 A1 | 9/2008 | Zhang et al. | |
| 2008/0227414 A1 | 9/2008 | Karmi et al. | |
| 2008/0227481 A1 | 9/2008 | Naguib et al. | |
| 2008/0232395 A1 | 9/2008 | Buckley et al. | |
| 2008/0267310 A1 | 10/2008 | Khan et al. | |
| 2008/0274753 A1 | 11/2008 | Attar et al. | |
| 2008/0279300 A1 | 11/2008 | Walker et al. | |
| 2008/0298482 A1 | 12/2008 | Rensburg et al. | |
| 2008/0307427 A1 | 12/2008 | Pi et al. | |
| 2008/0309633 A1 | 12/2008 | Hotelling et al. | |
| 2008/0312918 A1* | 12/2008 | Kim | G10L 15/01 |
| | | | 704/233 |
| 2008/0313146 A1 | 12/2008 | Wong et al. | |
| 2008/0317259 A1* | 12/2008 | Zhang | G10L 15/04 |
| | | | 381/92 |
| 2009/0041151 A1 | 2/2009 | Khan et al. | |
| 2009/0055170 A1* | 2/2009 | Nagahama | G10L 15/20 |
| | | | 704/226 |
| 2009/0059783 A1 | 3/2009 | Walker et al. | |
| 2009/0061790 A1 | 3/2009 | Rofougaran | |
| 2009/0061887 A1 | 3/2009 | Hart et al. | |
| 2009/0067382 A1 | 3/2009 | Li et al. | |
| 2009/0091551 A1 | 4/2009 | Hotelling et al. | |
| 2009/0102294 A1 | 4/2009 | Hodges et al. | |
| 2009/0121963 A1 | 5/2009 | Greene | |
| 2009/0122758 A1 | 5/2009 | Smith et al. | |
| 2009/0122884 A1 | 5/2009 | Vook et al. | |
| 2009/0207836 A1 | 8/2009 | Kawasaki et al. | |
| 2009/0228598 A1 | 9/2009 | Stamoulis et al. | |
| 2009/0238131 A1 | 9/2009 | Montojo et al. | |
| 2009/0243631 A1 | 10/2009 | Kuang | |
| 2009/0252077 A1 | 10/2009 | Khandekar et al. | |
| 2009/0256644 A1 | 10/2009 | Knudsen | |
| 2009/0258614 A1 | 10/2009 | Walker | |
| 2009/0262699 A1 | 10/2009 | Wdngerter et al. | |
| 2009/0264078 A1 | 10/2009 | Yun et al. | |
| 2009/0268675 A1 | 10/2009 | Choi | |
| 2009/0270103 A1 | 10/2009 | Pani et al. | |
| 2009/0276210 A1 | 11/2009 | Goto et al. | |
| 2009/0285321 A1 | 11/2009 | Schulz et al. | |
| 2009/0290544 A1 | 11/2009 | Yano et al. | |
| 2009/0295226 A1 | 12/2009 | Hodges et al. | |
| 2009/0298433 A1 | 12/2009 | Sorrells et al. | |
| 2009/0307511 A1 | 12/2009 | Fiennes et al. | |
| 2009/0323608 A1 | 12/2009 | Adachi et al. | |
| 2010/0002657 A1 | 1/2010 | Teo et al. | |
| 2010/0014690 A1* | 1/2010 | Wolff | H04R 3/005 |
| | | | 381/92 |
| 2010/0023898 A1 | 1/2010 | Nomura et al. | |

(56) References Cited

U.S. PATENT DOCUMENTS

| | | |
|---|---|---|
| 2010/0189191 A1 | 1/2010 | Taoka et al. |
| 2010/0034238 A1 | 2/2010 | Bennett |
| 2010/0034312 A1 | 2/2010 | Muharemovic et al. |
| 2010/0035627 A1 | 2/2010 | Hou et al. |
| 2010/0046460 A1 | 2/2010 | Kwak et al. |
| 2010/0046650 A1 | 2/2010 | Jongren et al. |
| 2010/0046763 A1* | 2/2010 | Homma .................. G10L 25/78 381/56 |
| 2010/0056166 A1 | 3/2010 | Tenny |
| 2010/0081487 A1* | 4/2010 | Chen .................. G10L 21/0208 455/575.1 |
| 2010/0085010 A1 | 4/2010 | Suzuki et al. |
| 2010/0092007 A1* | 4/2010 | Sun ........................ G10L 25/00 381/92 |
| 2010/0103949 A1 | 4/2010 | Jung et al. |
| 2010/0106459 A1 | 4/2010 | Bakalov |
| 2010/0109796 A1 | 5/2010 | Park et al. |
| 2010/0118706 A1 | 5/2010 | Parkvall et al. |
| 2010/0118839 A1 | 5/2010 | Malladi et al. |
| 2010/0128894 A1* | 5/2010 | Petit ........................ G10L 25/93 381/92 |
| 2010/0156728 A1 | 6/2010 | Alvey et al. |
| 2010/0157858 A1 | 6/2010 | Lee et al. |
| 2010/0157924 A1 | 6/2010 | Prasad et al. |
| 2010/0159833 A1 | 6/2010 | Lewis et al. |
| 2010/0161658 A1 | 6/2010 | Hamynen et al. |
| 2010/0165882 A1 | 7/2010 | Palanki et al. |
| 2010/0167743 A1 | 7/2010 | Palanki et al. |
| 2010/0172310 A1 | 7/2010 | Cheng et al. |
| 2010/0172311 A1 | 7/2010 | Agrawal et al. |
| 2010/0182903 A1 | 7/2010 | Palanki et al. |
| 2010/0195566 A1 | 8/2010 | Krishnamurthy et al. |
| 2010/0208838 A1 | 8/2010 | Lee et al. |
| 2010/0217590 A1* | 8/2010 | Nemer .................. G01S 3/8006 704/233 |
| 2010/0220801 A1 | 9/2010 | Lee et al. |
| 2010/0260154 A1 | 10/2010 | Frank et al. |
| 2010/0271330 A1 | 10/2010 | Philipp |
| 2010/0272094 A1 | 10/2010 | Byard et al. |
| 2010/0274516 A1 | 10/2010 | Hoebel et al. |
| 2010/0291918 A1 | 11/2010 | Suzuki et al. |
| 2010/0311437 A1 | 12/2010 | Palanki et al. |
| 2010/0317343 A1 | 12/2010 | Krishnamurthy |
| 2010/0322176 A1 | 12/2010 | Chen et al. |
| 2010/0323718 A1 | 12/2010 | Jen |
| 2011/0026722 A1* | 2/2011 | Jing .................... G10L 21/0208 381/71.1 |
| 2011/0039583 A1 | 2/2011 | Frank et al. |
| 2011/0051834 A1 | 3/2011 | Lee et al. |
| 2011/0080969 A1 | 4/2011 | Jongren et al. |
| 2011/0083066 A1 | 4/2011 | Chung et al. |
| 2011/0085588 A1 | 4/2011 | Zhuang |
| 2011/0085610 A1 | 4/2011 | Zhuang et al. |
| 2011/0096739 A1 | 4/2011 | Heidari et al. |
| 2011/0096915 A1* | 4/2011 | Nemer .................. H04M 3/568 379/158 |
| 2011/0103498 A1 | 5/2011 | Chen et al. |
| 2011/0105023 A1 | 5/2011 | Scheer |
| 2011/0116423 A1 | 5/2011 | Rousu et al. |
| 2011/0116436 A1 | 5/2011 | Bachu et al. |
| 2011/0117925 A1 | 5/2011 | Sampath et al. |
| 2011/0119005 A1 | 5/2011 | Majima et al. |
| 2011/0121836 A1 | 5/2011 | Kim et al. |
| 2011/0143770 A1 | 6/2011 | Charbit et al. |
| 2011/0143773 A1 | 6/2011 | Kangas et al. |
| 2011/0148625 A1 | 6/2011 | Velusamy |
| 2011/0148700 A1 | 6/2011 | Lasagabaster et al. |
| 2011/0149868 A1 | 6/2011 | Krishnamurthy et al. |
| 2011/0149903 A1 | 6/2011 | Krishnamurthy et al. |
| 2011/0157067 A1 | 6/2011 | Wagner et al. |
| 2011/0158200 A1 | 6/2011 | Bachu et al. |
| 2011/0176252 A1 | 7/2011 | DeReus |
| 2011/0189964 A1 | 8/2011 | Jeon et al. |
| 2011/0190016 A1 | 8/2011 | Hamabe et al. |
| 2011/0216840 A1 | 9/2011 | Lee et al. |
| 2011/0244884 A1 | 10/2011 | Kangas et al. |
| 2011/0249637 A1 | 10/2011 | Hammarwall et al. |
| 2011/0250852 A1 | 10/2011 | Greene |
| 2011/0263303 A1 | 10/2011 | Lowles et al. |
| 2011/0268101 A1 | 11/2011 | Wang |
| 2011/0274188 A1 | 11/2011 | Sayana et al. |
| 2011/0281532 A1 | 11/2011 | Shin et al. |
| 2011/0285603 A1 | 11/2011 | Skarp |
| 2011/0286349 A1 | 11/2011 | Tee et al. |
| 2011/0292844 A1 | 12/2011 | Kwun et al. |
| 2011/0319027 A1 | 12/2011 | Sayana |
| 2012/0002609 A1 | 1/2012 | Larsson et al. |
| 2012/0008510 A1 | 1/2012 | Cai et al. |
| 2012/0021769 A1 | 1/2012 | Lindoff et al. |
| 2012/0032646 A1 | 2/2012 | Lee |
| 2012/0039251 A1 | 2/2012 | Sayana |
| 2012/0050122 A1 | 3/2012 | Wu et al. |
| 2012/0052903 A1 | 3/2012 | Han et al. |
| 2012/0071195 A1 | 3/2012 | Chakraborty et al. |
| 2012/0076043 A1 | 3/2012 | Nishio et al. |
| 2012/0077538 A1 | 3/2012 | Yun |
| 2012/0106475 A1 | 5/2012 | Jung |
| 2012/0112851 A1 | 5/2012 | Manssen et al. |
| 2012/0120772 A1 | 5/2012 | Fujisawa |
| 2012/0120934 A1 | 5/2012 | Cho |
| 2012/0122478 A1 | 5/2012 | Siomina et al. |
| 2012/0128175 A1* | 5/2012 | Visser .................... H04R 3/005 381/92 |
| 2012/0158839 A1 | 6/2012 | Hassan et al. |
| 2012/0161927 A1 | 6/2012 | Pierfelice et al. |
| 2012/0162129 A1 | 6/2012 | Krah et al. |
| 2012/0170541 A1 | 7/2012 | Love et al. |
| 2012/0177089 A1 | 7/2012 | Pelletier et al. |
| 2012/0178370 A1 | 7/2012 | George |
| 2012/0182144 A1 | 7/2012 | Richardson et al. |
| 2012/0206556 A1 | 8/2012 | Yu et al. |
| 2012/0209603 A1* | 8/2012 | Jing .................... G10L 21/0364 704/233 |
| 2012/0214412 A1 | 8/2012 | Schlub et al. |
| 2012/0214421 A1 | 8/2012 | Hoirup et al. |
| 2012/0214549 A1 | 8/2012 | Philbin |
| 2012/0220243 A1 | 8/2012 | Mendolia |
| 2012/0224715 A1* | 9/2012 | Kikkeri .................. H04R 3/005 381/92 |
| 2012/0295554 A1 | 11/2012 | Greene et al. |
| 2012/0295555 A1 | 11/2012 | Greene et al. |
| 2012/0302188 A1 | 11/2012 | Sahota et al. |
| 2012/0306716 A1 | 12/2012 | Satake et al. |
| 2012/0309388 A1 | 12/2012 | Moosavi et al. |
| 2012/0309413 A1 | 12/2012 | Grosman et al. |
| 2012/0316967 A1 | 12/2012 | Mgrdechian et al. |
| 2013/0013303 A1* | 1/2013 | Strommer ............... G10L 21/02 704/226 |
| 2013/0030803 A1* | 1/2013 | Liao ...................... G10L 15/20 704/233 |
| 2013/0034241 A1* | 2/2013 | Pandey ................ H04R 29/007 381/92 |
| 2013/0039284 A1 | 2/2013 | Marinier et al. |
| 2013/0040578 A1 | 2/2013 | Khoshnevis et al. |
| 2013/0059600 A1 | 3/2013 | Elsom-Cook et al. |
| 2013/0078980 A1 | 3/2013 | Saito |
| 2013/0094484 A1 | 4/2013 | Kneckt et al. |
| 2013/0109314 A1 | 5/2013 | Kneckt et al. |
| 2013/0109334 A1 | 5/2013 | Kwon et al. |
| 2013/0142113 A1 | 6/2013 | Fong et al. |
| 2013/0150092 A1 | 6/2013 | Frank et al. |
| 2013/0178175 A1 | 7/2013 | Kato |
| 2013/0194154 A1 | 8/2013 | Ballarda et al. |
| 2013/0195283 A1 | 8/2013 | Larson et al. |
| 2013/0195296 A1* | 8/2013 | Merks .................. H04R 25/402 381/313 |
| 2013/0225101 A1 | 8/2013 | Basaran et al. |
| 2013/0226324 A1* | 8/2013 | Hannuksela ............. H04S 7/30 700/94 |
| 2013/0231151 A1 | 9/2013 | Kneckt et al. |
| 2013/0286937 A1 | 10/2013 | Liu et al. |

(56) References Cited

U.S. PATENT DOCUMENTS

| | | | |
|---|---|---|---|
| 2013/0300648 A1* | 11/2013 | Kim | G06F 3/011 345/156 |
| 2013/0307735 A1 | 11/2013 | Contreras et al. | |
| 2013/0310102 A1 | 11/2013 | Chao et al. | |
| 2013/0316687 A1 | 11/2013 | Subbaramoo et al. | |
| 2013/0322375 A1 | 12/2013 | Chang et al. | |
| 2013/0322562 A1 | 12/2013 | Zhang et al. | |
| 2013/0322655 A1* | 12/2013 | Schuldt | G10L 21/02 381/119 |
| 2013/0325149 A1 | 12/2013 | Manssen et al. | |
| 2014/0024321 A1 | 1/2014 | Zhu et al. | |
| 2014/0044126 A1 | 2/2014 | Sabhanatarajan et al. | |
| 2014/0045422 A1 | 2/2014 | Qi et al. | |
| 2014/0068288 A1 | 3/2014 | Robinson et al. | |
| 2014/0092830 A1 | 4/2014 | Chen et al. | |
| 2014/0093091 A1* | 4/2014 | Dusan | H04R 1/1083 381/74 |
| 2014/0177686 A1 | 6/2014 | Greene et al. | |
| 2014/0185498 A1 | 7/2014 | Schwent et al. | |
| 2014/0207983 A1* | 7/2014 | Jones | G06F 13/4291 710/105 |
| 2014/0227981 A1 | 8/2014 | Pecen et al. | |
| 2014/0273882 A1 | 9/2014 | Asrani et al. | |
| 2014/0273886 A1 | 9/2014 | Black et al. | |
| 2014/0313088 A1 | 10/2014 | Rozenblit et al. | |
| 2014/0349593 A1 | 11/2014 | Danak et al. | |
| 2014/0376652 A1 | 12/2014 | Sayana et al. | |
| 2014/0379332 A1* | 12/2014 | Rodriguez | G10L 17/00 704/219 |
| 2015/0017978 A1 | 1/2015 | Hong et al. | |
| 2015/0024786 A1 | 1/2015 | Asrani et al. | |
| 2015/0031420 A1 | 1/2015 | Higaki et al. | |
| 2015/0072632 A1 | 3/2015 | Pourkhaatoun et al. | |
| 2015/0080047 A1 | 3/2015 | Russell et al. | |
| 2015/0092954 A1 | 4/2015 | Coker et al. | |
| 2015/0171919 A1 | 6/2015 | Ballantyne et al. | |
| 2015/0181388 A1 | 6/2015 | Smith | |
| 2015/0236828 A1 | 8/2015 | Park et al. | |
| 2015/0245323 A1 | 8/2015 | You et al. | |
| 2015/0280674 A1 | 10/2015 | Langer et al. | |
| 2015/0280675 A1 | 10/2015 | Langer et al. | |
| 2015/0280876 A1 | 10/2015 | You et al. | |
| 2015/0312058 A1 | 10/2015 | Black et al. | |
| 2015/0349410 A1 | 12/2015 | Russell et al. | |
| 2015/0365065 A1 | 12/2015 | Higaki et al. | |
| 2016/0014727 A1 | 1/2016 | Nimbalker | |
| 2016/0036482 A1 | 2/2016 | Black et al. | |
| 2016/0080053 A1 | 3/2016 | Sayana et al. | |
| 2018/0062882 A1 | 3/2018 | Klomsdorf et al. | |

FOREIGN PATENT DOCUMENTS

| | | |
|---|---|---|
| CN | 1984476 | 6/2007 |
| CN | 101035379 | 9/2007 |
| DE | 10053205 | 5/2002 |
| DE | 10118189 | 11/2002 |
| EP | 0695059 | 1/1996 |
| EP | 1158686 | 11/2001 |
| EP | 1298809 | 4/2003 |
| EP | 1357543 A2 | 10/2003 |
| EP | 1511010 A1 | 3/2005 |
| EP | 1753152 | 2/2007 |
| EP | 1443791 | 2/2009 |
| EP | 2487967 | 8/2012 |
| EP | 2255443 | 11/2012 |
| EP | 2557433 | 2/2013 |
| EP | 2568531 | 3/2013 |
| EP | 2590258 | 5/2013 |
| JP | H09247852 | 9/1997 |
| JP | 2000286924 | 10/2000 |
| KR | 20050058333 | 6/2005 |
| RU | 2005113251 | 1/2006 |
| WO | WO-9306682 | 4/1993 |
| WO | WO 94/16517 A1 | 7/1994 |
| WO | WO-9600401 | 1/1996 |
| WO | WO-1999021389 | 4/1999 |
| WO | WO-1999050968 | 10/1999 |
| WO | WO-0111721 | 2/2001 |
| WO | WO-2003007508 | 1/2003 |
| WO | WO 03/107327 A1 | 12/2003 |
| WO | WO-2004021634 | 3/2004 |
| WO | WO-20040040800 | 5/2004 |
| WO | WO-2004084427 | 9/2004 |
| WO | WO-2004084447 | 9/2004 |
| WO | WO-2006039434 | 4/2006 |
| WO | WO-2006046192 | 5/2006 |
| WO | WO-2006130278 | 12/2006 |
| WO | WO-2007052115 | 5/2007 |
| WO | WO-2007080727 | 7/2007 |
| WO | WO-2008027705 | 3/2008 |
| WO | WO-2008033117 | 3/2008 |
| WO | WO-2008085107 | 7/2008 |
| WO | WO-2008085416 | 7/2008 |
| WO | WO-2008085720 | 7/2008 |
| WO | WO-2008112849 | 9/2008 |
| WO | WO-2008113210 | 9/2008 |
| WO | WO-2008137354 | 11/2008 |
| WO | WO-2008137607 | 11/2008 |
| WO | WO-2008156081 | 12/2008 |
| WO | WO-2009107090 | 9/2009 |
| WO | WO-2010080845 | 7/2010 |
| WO | WO-2010124244 | 10/2010 |
| WO | WO-2010138039 | 12/2010 |
| WO | WO-2012115649 | 8/2012 |
| WO | WO-2012149968 | 11/2012 |
| WO | WO-2012177939 | 12/2012 |
| WO | WO-2013131268 | 9/2013 |

OTHER PUBLICATIONS

Li, et al. "A Subband Feedback Controlled Generalized Sidelobe Canceller in Frequency Domain with Multi-Channel Postfilter," 2nd International Workshop on Intelligent Systems and Applications (ISA), IEEE, pp. 1-4 (May 22, 2010).

WIPO, International Search Report, PCT Application No. PCT/US2014/014375, dated Apr. 17, 2014. (4 pages).

Tesoriero, R. et al., "Improving location awareness in indoor spaces using RFID technology", ScienceDirect, Expert Systems with Applications, 37 (2010) pp. 894-898.

"Coverage enhancement for RACH messages", 3GPP TSG-RAN WG1 Meeting #76, R1-140153, Alcatel-Lucent, Alcatel-Lucent Shanghai Bell, Feb. 2014, 5 pages.

"Coverage Improvement for PRACH", 3GPP TSG RAN WG1 Meeting #76—R1-140115, Intel Corporation, Feb. 2014, 9 pages.

"International Search Report and Written Opinion", Application No. PCT/US2015/033570, dated Oct. 19, 2015, 18 pages.

"Non-Final Office Action", U.S. Appl. No. 14/280,775, dated Mar. 23, 2016, 11 pages.

"Notice of Allowance", U.S. Appl. No. 13/873,557, dated Apr. 11, 2016, 5 pages.

"Notice of Allowance", U.S. Appl. No. 14/952,738, dated Mar. 28, 2016, 7 pages.

"On the need of PDCCH for SIB, RAR and Paging", 3GPP TSG-RAN WG1 #76-R1-140239, Feb. 2014, 4 pages.

"Specification Impact of Enhanced Filtering for Scalable UMTS", 3GPP TSG RAN WG1 Meeting #76, R1-140726, QUALCOMM Incorporated, Feb. 2014, 2 pages.

"Supplemental Notice of Allowance", U.S. Appl. No. 14/031,739, dated Apr. 21, 2016, 2 pages.

"Written Opinion", Application No. PCT/US2013/071616, dated Jun. 3, 2015, 9 pages.

Yu-chun,"A New Downlink Control Channel Scheme for LTE", Vehicular Technology Conference (VTC Spring), 2013 IEEE 77th, Jun. 2, 2013, 6 pages.

"3rd Generation Partnership Project; Technical Specification Group Radio Access Network", 3GPP TR 36.814 V9.0.0 (Mar. 2010), Further Advancements for E-UTRA Physical Layer Aspects (Release 9), Mar. 2010, 104 pages.

(56) References Cited

OTHER PUBLICATIONS

"A feedback framework based on W2W1 for Rei. 10", 3GPP TSG RAN WG1 #61bis, R1-103664,, Jun. 2010, 19 pages.
"Addition of PRS Muting Configuration Information to LPPa", 3GPP TSG RAN3 #68, Montreal, Canada; Ericsson, R3-101526, May 2010, 7 pages.
"Advisory Action", U.S. Appl. No. 12/650,699, dated Jan. 30, 2013, 3 pages.
"Advisory Action", U.S. Appl. No. 12/650,699, dated Sep. 25, 2014, 3 pages.
"An-1432 The LM4935 Headset and Push-Button Detection Guide", Texas Instruments Incorporated—http://www.ti.com/lit/an/snaa024a.snaa024a.pdf, May 2013, 8 pages.
"Best Companion' reporting for improved single-cell MU-MIMO pairing", 3GPP TSG RAN WG1 #56; Athens, Greece; Alcatei-Lucent, R1-090926, Feb. 2009, 5 pages.
"Change Request—Clarification of the CP length of empty OFDM symbols in PRS subframes", 3GPP TSG RAN WG1 #59bis, Jeju, Vaiencia, Spain, ST-Ericsson, Motorola, Qualcomm Inc, R1-100311;, Jan. 2009, 2 pages.
"Change Request 36.211—Introduction of L TE Positioning", 3GPP TSG RAN WG1 #59, Jeju, South Korea; Ericsson, R1-095027, May 2010, 6 pages.
"Change Request 36.213 Clarification of POSCH and PRS in combination for L TE positioning", 3GPP TSG RAN WG1 #58bis, Miyazaki, Japan; Ericsson, et al., R1-094262;, Oct. 2009, 4 pages.
"Change Request 36.214—Introduction of LTE Positioning", 3GPP TSG RAN WG1 #59, Jeju, South Korea, Ericsson, et al., R1-094430, Nov. 2009, 4 pages.
"Companion Subset Based PMI/CQI Feedback for LTE-A MU-MIMO", 3GPP TSG RAN WG1 #60; San Francisco, USA, RIM; R1-101104, Feb. 2010, 8 pages.
"Comparison of PMI-based and SCF-based MU-MIMO", 3GPP TSG RAN1 #58; Shenzhen, China; R1-093421,, Aug. 2009, 5 pages.
"Development of two-stage feedback framework for Rel-10", 3GPP TSG RAN WG1 #60bis Meeting, R1-101859, Alcatel-Lucent Shanghai Bell, Alcatel-Lucent, Apr. 2010, 5 pages.
"Digital cellular telecommunications system (Phase 2+)", Location Services (LCS); Broadcast Network Assistance for Enhanced Observed Time Difference (E-OTD) and Global Positioning System (GPS) Positioning Methods (3GPP TS 04.35 version 8.3.0 Release 1999), 2001, 37 pages.
"Discussions on UE positioning issues", 3GPP TSG-RAN WG1 #57 R1-091911, San Francisco, USA,, May 2009, 12 pages.
"DL Codebook design for 8Tx preceding", 3GPP TSG RAN WG1 #60bis, R1-102380, LG Electronics, Beijing, China, Apr. 2010, 4 pages.
"Double codebook design principles", 3GPP TSG RAN WG1 #61bis, R1-103804, Nokia, Nokia Siemens Networks, Dresden, Germany, Jun. 2010, 9 pages.
"Earbud with Push-to-Talk Microphone", Motorola, Inc., model 53727, iDEN 2.5 mm 4-pole mono PTT headset NNTNN5006BP, 2013, 10 pages.
"Evaluation of protocol architecture alternatives for positioning", 3GPP TSG-RAN WG2 #66bis R2-093855, Los Angeles, CA, USA, Jun. 2009, 4 pages.
"Ex Parte Quayle Action", U.S. Appl. No. 13/088,237, Dec. 19, 2012, 5 pages.
"Extended European Search Report", EP Application No. 12196319.3, dated Feb. 27, 2014, 7 pages.
"Extended European Search Report", EP Application No. 12196328.4, dated Feb. 26, 2014, 7 pages.
"Extensions to Rel-8 type CQI/PMI/RI feedback using double codebook structure", 3GPP TSG RAN WG1#59bis, R1-100251, Valencia, Spain,, Jan. 2010, 4 pages.
"Feedback Codebook Design and Performance Evaluation", 3GPP TSG RAN WG1 #61bis, R1-103970, LG Electronics, Jun. 2010, 6 pages.

"Feedback considerations for DL MIMO and CoMP", 3GPP TSG RAN WG1 #57bis; Los Angeles, USA; Qualcomm Europe; R1-092695, Jun. 2009, 6 pages.
"Final Improvement Proposal for PTT Support in HFP", Bluetooth Sig, Inc., revision V10r00 (PTTinHFP_FIPD), Jul. 20, 2010, 50 pages.
"Final Office Action", U.S. Appl. No. 12/407,783, dated Feb. 15, 2012, 18 pages.
"Final Office Action", U.S. Appl. No. 12/573,456, dated Mar. 21, 2012, 12 pages.
"Final Office Action", U.S. Appl. No. 12/650,699, dated Jul. 16, 2014, 20 pages.
"Final Office Action", U.S. Appl. No. 12/650,699, dated Jul. 29, 2015, 26 pages.
"Final Office Action", U.S. Appl. No. 12/650,699, dated Nov. 13, 2012, 17 pages.
"Final Office Action", U.S. Appl. No. 12/756,777, dated Nov. 1, 2013, 12 pages.
"Final Office Action", U.S. Appl. No. 12/899,211, dated Oct. 24, 2013, 17 pages.
"Final Office Action", U.S. Appl. No. 13/477,609, dated Jul. 31, 2015, 11 pages.
"Final Office Action", U.S. Appl. No. 13/721,771, dated Oct. 29, 2015, 8 pages.
"Final Office Action", U.S. Appl. No. 13/733,297, dated Jul. 22, 2015, 20 pages.
"Final Office Action", U.S. Appl. No. 13/873,557, dated Jul. 17, 2015, 13 pages.
"Final Office Action", U.S. Appl. No. 14/012,050, dated Jul. 6, 2015, 23 pages.
"Final Office Action", U.S. Appl. No. 14/052,903, dated Oct. 1, 2015, 10 pages.
"Final Office Action", U.S. Appl. No. 14/150,047, dated Mar. 4, 2016, 14 pages.
"Final Office Action", U.S. Appl. No. 14/280,775, dated Dec. 9, 2015, 13 pages.
"Foreign Office Action", CN Application No. 201080025882.7, dated Feb. 8, 2014, 19 pages.
"Further details on DL OTDOA", 3GPP TSG RAN WG1 #56bis, Seoul, South Korea—Ericsson, R1-091312,, Mar. 2009, 6 pages.
"Further Refinements of Feedback Framework", 3GPP TSG-RAN WG1 #60bis R1-101742; Ericsson, ST-Ericsson, Apr. 2010, 8 pages.
"IEEE 802.16m System Description Document [Draft]", IEEE 802.16 Broadband Wireless Access Working Group, Nokia, Feb. 7, 2009, 171 pages.
"Implicit feedback in support of downlink MU-MIMO" Texas Instruments, 3GPP TSG RAN WG1 #58; Shenzhen, China, R1-093176, Aug. 2009, 4 pages.
"Improving the hearability of LTE Positioning Service", 3GPP TSG RAN WG1 #55bis; Alcatei-Lucent, R1-090053,, Jan. 2009, 5 pages.
"Innovator in Electronics, Technical Update, Filters & Modules PRM Alignment", Module Business Unit, Apr. 2011, 95 pages.
"International Preliminary Report on Patentability", Application No. PCT/US2013/042042, dated Mar. 10, 2015, 8 pages.
"International Search Report and Written Opinion", Application No. PCT/US2014/060440, dated Feb. 5, 2015, 11 pages.
"International Search Report and Written Opinion", Application No. PCT/US2015/031328, dated Aug. 12, 2015, 11 pages.
"International Search Report and Written Opinion", Application No. PCT/US2014/045755, dated Oct. 23, 2014, 11 pages.
"International Search Report and Written Opinion", Application No. PCT/US2014/045956, dated Oct. 31, 2014, 11 pages.
"International Search Report and Written Opinion", Application No. PCT/US2014/056642, dated Dec. 9, 2014, 11 pages.
"International Search Report and Written Opinion", Application No. PCT/US2013/071615, dated Mar. 5, 2014, 13 pages.
"International Search Report and Written Opinion", Application No. PCT/US2013/040242, dated Oct. 4, 2013, 14 pages.
"International Search Report and Written Opinion", Application No. PCT/US2014/047233, dated Jan. 22, 2015, 8 pages.
"International Search Report and Written Opinion", Application No. PCT/US2013/077919, dated Apr. 24, 2014, 8 pages.

(56) References Cited

OTHER PUBLICATIONS

"International Search Report and Written Opinion", Application No. PCT/US2014/070925, dated May 11, 2015, 9 pages.
"International Search Report and Written Opinion", Application No. PCT/US2014/018564, dated Jun. 18, 2014, 11 pages.
"International Search Report and Written Opinion", Application No. PCT/US2013/072718, dated Jun. 18, 2014, 12 pages.
"International Search Report and Written Opinion", Application No. PCT/US2015/027872, dated Jul. 15, 2015, 12 pages.
"International Search Report and Written Opinion", Application No. PCT/US2010/026579, dated Feb. 4, 2011, 13 pages.
"International Search Report and Written Opinion", Application No. PCT/US2011/034959, dated Aug. 16, 2011, 13 pages.
"International Search Report and Written Opinion", Application No. PCT/US2011/045209, dated Oct. 28, 2011, 14 pages.
"International Search Report and Written Opinion", Application No. PCT/US2011/039214, dated Sep. 14, 2011, 9 pages.
"International Search Report and Written Opinion", Application No. PCT/US2010/038257, dated Oct. 1, 2010, 9 pages.
"International Search Report and Written Opinion", Application No. PCT/US2010/034023, dated Dec. 1, 2010, 9 pages.
"International Search Report", Application No. PCT/US20013/071616, dated Mar. 5, 2014, 2 pages.
"International Search Report", Application No. PCT/US2010/030516, dated Oct. 8, 2010, 5 pages.
"International Search Report", Application No. PCT/US2010/036982, dated Nov. 22, 2010, 4 pages.
"International Search Report", Application No. PCT/US2010/041451, dated Oct. 25, 2010, 3 pages.
"International Search Report", Application No. PCT/US2011/044103, dated Oct. 24, 2011, 3 pages.
"Introduction of L TE Positioning", 3GPP TSG RAN WG1 #58, Shenzhen, China, R1-093604; Draft CR 36.213, Aug. 2009, 3 pages.
"Introduction of L TE Positioning", 3GPP TSG RAN WG1 #59, Jeju, South Korea, Ericsson et al.; R1-094429,, Nov. 2009, 5 pages.
"Introduction of LTE Positioning",, 3GPP TSG RAN WG1 #58, Shenzhen, China; Draft CR 36.214; R1-093605;, Aug. 2009, 6 pages.
"Introduction of LTE Positioning",, 3GPP TSG-RAN WG1 Meeting #58, R1-093603, Shenzhen, China,, Aug. 2009, 5 pages.
"LS on 12 5. Assistance Information for OTDOA Positioning Support for L TE Rel-9", 3GPP TSG RAN WG1 Meeting #58; Shenzhen, China; R1-093729, Aug. 2009, 3 pages.
"LS on LTE measurement supporting Mobility", 3GPP TSG WG1 #48, Tdoc R1-071250; StLouis, USA, Feb. 2007, 2 pages.
"LTE Positioning Protocol (LPP)", 3GPP TS 36.355 V9.0.0 (Dec. 2009); 3rd Generation Partnership Project; Technical Specification Group Radio Access Network; Evolved Universal Terrestrial Radio Access (E-UTRA); Release 9, Dec. 2009, 102 pages.
"Market & Motivation (MRD Section3) for Interoperability Testing of Neighbor Awareness Networking", WiFi Alliance Neighbor Awareness Networking Marketing Task Group, Version 0.14, 2011, 18 pages.
"Marketing Statement of Work Neighbor Awareness Networking", Version 1.17, Neighbor Awareness Networking Task Group, May 2012, 18 pages.
"Method for Channel Quality Feedback in Wireless Communication Systems", U.S. Appl. No. 12/823,178, filed Jun. 25, 2010, 34 pages.
"Motorola SJYN0505A Stereo Push to Talk Headset for Nextel", Motorola Inc., iDEN 5-pole 2.5 mm Stereo Headset SJYN05058A, 2010, 2 pages.
"Non-Final Office Action", U.S. Appl. No. 12/407,783, dated Sep. 9, 2013, 16 pages.
"Non-Final Office Action", U.S. Appl. No. 12/407,783, dated Oct. 5, 2011, 14 pages.
"Non-Final Office Action", U.S. Appl. No. 12/480,289, dated Jun. 9, 2011, 20 pages.
"Non-Final Office Action", U.S. Appl. No. 12/492,339, dated Aug. 19, 2011, 13 pages.
"Non-Final Office Action", U.S. Appl. No. 12/542,374, dated Feb. 24, 2014, 25 pages.
"Non-Final Office Action", U.S. Appl. No. 12/542,374, dated Aug. 7, 2013, 22 pages.
"Non-Final Office Action", U.S. Appl. No. 12/542,374, dated Aug. 31, 2012, 27 pages.
"Non-Final Office Action", U.S. Appl. No. 12/542,374, dated Dec. 23, 2011, 22 pages.
"Non-Final Office Action", U.S. Appl. No. 12/573,456, dated Nov. 18, 2011, 9 pages.
"Non-Final Office Action", U.S. Appl. No. 12/577,553, dated Feb. 4, 2014, 10 pages.
"Non-Final Office Action", U.S. Appl. No. 12/577,553, dated Aug. 12, 2013, 11 pages.
"Non-Final Office Action", U.S. Appl. No. 12/577,553, dated Dec. 28, 2011, 7 pages.
"Non-Final Office Action", U.S. Appl. No. 12/650,699, dated Mar. 30, 2015, 28 pages.
"Non-Final Office Action", U.S. Appl. No. 12/650,699, dated Apr. 23, 2013, 19 pages.
"Non-Final Office Action", U.S. Appl. No. 12/650,699, dated Jul. 19, 2012, 12 pages.
"Non-Final Office Action", U.S. Appl. No. 12/650,699, dated Dec. 16, 2013, 26 pages.
"Non-Final Office Action", U.S. Appl. No. 12/756,777, dated Apr. 19, 2013, 17 pages.
"Non-Final Office Action", U.S. Appl. No. 12/813,221, dated Oct. 8, 2013, 10 pages.
"Non-Final Office Action", U.S. Appl. No. 12/823,178, dated Aug. 23, 2012, 15 pages.
"Non-Final Office Action", U.S. Appl. No. 12/899,211, dated Apr. 10, 2014, 12 pages.
"Non-Final Office Action", U.S. Appl. No. 12/899,211, dated May 22, 2013, 17 pages.
"Non-Final Office Action", U.S. Appl. No. 12/973,467, dated Mar. 28, 2013, 9 pages.
"Non-Final Office Action", U.S. Appl. No. 13/477,609, dated Dec. 3, 2014, 7 pages.
"Non-Final Office Action", U.S. Appl. No. 13/477,609, dated Dec. 14, 2015, 9 pages.
"Non-Final Office Action", U.S. Appl. No. 13/692,520, dated Sep. 5, 2014, 15 pages.
"Non-Final Office Action", U.S. Appl. No. 13/692,520, dated Oct. 5, 2015, 17 pages.
"Non-Final Office Action", U.S. Appl. No. 13/721,771, dated May 20, 2015, 6 pages.
"Non-Final Office Action", U.S. Appl. No. 13/733,297, dated Feb. 2, 2016, 17 pages.
"Non-Final Office Action", U.S. Appl. No. 13/733,297, dated Mar. 13, 2015, 23 pages.
"Non-Final Office Action", U.S. Appl. No. 13/759,089, dated Apr. 18, 2013, 16 pages.
"Non-Final Office Action", U.S. Appl. No. 13/873,557, dated Mar. 11, 2015, 19 pages.
"Non-Final Office Action", U.S. Appl. No. 13/924,838, dated Nov. 28, 2014, 6 pages.
"Non-Final Office Action", U.S. Appl. No. 13/945,968, dated Apr. 28, 2015, 16 pages.
"Non-Final Office Action", U.S. Appl. No. 14/012,050, dated Feb. 10, 2015, 18 pages.
"Non-Final Office Action", U.S. Appl. No. 14/031,739, dated Aug. 18, 2015, 16 pages.
"Non-Final Office Action", U.S. Appl. No. 14/052,903, dated Mar. 11, 2015, 7 pages.
"Non-Final Office Action", U.S. Appl. No. 14/068,309, dated Oct. 2, 2015, 14 pages.
"Non-Final Office Action", U.S. Appl. No. 14/150,047, dated Jun. 29, 2015, 11 pages.
"Non-Final Office Action", U.S. Appl. No. 14/226,041, dated Jun. 5, 2015, 8 pages.
"Non-Final Office Action", U.S. Appl. No. 14/280,775, dated Jul. 16, 215, 9 pages.

(56) References Cited

OTHER PUBLICATIONS

"Non-Final Office Action", U.S. Appl. No. 14/330,317, dated Feb. 25, 2016, 14 pages.
"Non-Final Office Action", U.S. Appl. No. 14/339,476, dated Jan. 20, 2016, 9 pages.
"Non-Final Office Action", U.S. Appl. No. 14/445,715, dated Jan. 15, 2016, 26 pages.
"Non-Final Office Action", U.S. Appl. No. 14/952,738, dated Jan. 11, 2016, 7 pages.
"Notice of Allowance", U.S. Appl. No. 12/365,166, dated Apr. 16, 2010, 7 pages.
"Notice of Allowance", U.S. Appl. 12/365,166, dated Aug. 25, 2010, 4 pages.
"Notice of Allowance", U.S. Appl. No. 12/650,699, dated Jan. 14, 2016, 8 pages.
"Notice of Allowance", U.S. Appl. No. 13/040,090, dated Mar. 8, 2012, 6 pages.
"Notice of Allowance", U.S. Appl. No. 13/088,237, dated Jun. 17, 2013, 8 pages.
"Notice of Allowance", U.S. Appl. No. 13/088,237, dated Jul. 11, 2013, 8 pages.
"Notice of Allowance", U.S. Appl. No. 13/188,419, dated May 22, 2013, 8 pages.
"Notice of Allowance", U.S. Appl. No. 13/873,557, dated Dec. 23, 2015, 10 pages.
"Notice of Allowance", U.S. Appl. No. 13/924,838, dated Mar. 12, 2015, 7 pages.
"Notice of Allowance", U.S. Appl. No. 13/924,838, dated Jul. 8, 2015, 7 pages.
"Notice of Allowance", U.S. Appl. No. 13/945,968, dated Sep. 16, 2015, 6 pages.
"Notice of Allowance", U.S. Appl. No. 14/012,050, dated Dec. 14, 2015, 12 pages.
"Notice of Allowance", U.S. Appl. No. 14/031,739, dated Mar. 1, 2016, 7 pages.
"Notice of Allowance", U.S. Appl. No. 14/052,903, dated Feb. 1, 2016, 8 pages.
"Notice of Allowance", U.S. Appl. No. 14/226,041, dated Dec. 31, 2015, 5 pages.
"Notice of Allowance", U.S. Appl. No. 14/488,709, dated Sep. 23, 2015, 10 pages.
"On Extensions to Rel-8 PMI Feedback", 3GPP TSG RAN WG1 #60, R1-101129, Motorola, San Francisco, USA,, Feb. 2010, 4 pages.
"On OTDOA in LTE", 3GPP TSG RAN WG1 #55bis, Ljubljana, Slovenia; R1-090353, Jan. 2009, 8 pages.
"On OTDOA method for L TE Positioning", 3GPP TSG RAN WG1 #56, Ericsson, R1-090918, Athens, Greece, Feb. 2009, 6 pages.
"On Serving Cell Muting for OTDOA Measurements", 3GPP TSG RAN1 #57, R1-092628—Los Angeles, CA, USA, Jun. 2009, 7 pages.
"Performance evaluation of adaptive codebook as enhancement of 4 Tx feedback", 3GPP TSG RAN WG1#61bis, R1-103447, Jul. 2010, 6 pages.
"PHY Layer 1 1 4. Specification Impact of Positioning Improvements", 3GPP TSG RAN WG1 #56bis, Athens, Greece; Qualcomm Europe, R1-090852,, Feb. 2009, 3 pages.
"Physical Channels and Modulation (Release 8)", 3GPP TS 36.211 V8.6.0 (Mar. 2009) 3rd Generation Partnership Project; Technical Specification Group Radio Access 28 Network; Evolved Universal Terrestrial Radio Access (E-UTRA);, Mar. 2009, 83 pages.
"Physical Channels and Modulation (Release 9)", 3GPP TS 36.211 V9.0.0 (Dec. 2009); 3rd Generation Partnership Project; Technical Specification Group Radio Access Network; Evolved Universal Terrestrial Radio Access (E-UTRA); Release 9, Dec. 2009, 85 pages.
"Physical layer procedures", 3GPP TS 36.213 V9.0.1 (Dec. 2009); 3rd Generation Partnership Project; Technical Specification Group Radio Access Network; Evolved Universal Terrestrial Radio Access (E-UTRA); Release 9, Dec. 2009, 79 pages.

"Positioning Subframe Muting for OTDOA Measurements", 3GPP TSG RAN1 #58 R1-093406, Shenzhen, P. R. China, Aug. 2009, 9 pages.
"Positioning Support for L TE", 3GPP TSG RAN WG1 #42, Athens, Greece, RP-080995, Dec. 2008, 5 pages.
"Pre-Brief Appeal Conference Decision", U.S. Appl. No. 12/650,699, Apr. 9, 2013, 2 pages.
"Rationale for mandating simulation of 4Tx Widely-Spaced Cross-Polarized Antenna Configuration for LTE-Advanced MU-MIMO", 3GPP TSG-RAN WG1 Meeting #61bis, R1-104184, Dresden, Germany, Jun. 2010, 5 pages.
"Reference Signals for Low Interference Subframes in Downlink;", 3GPP TSG RAN WG1 Meeting #56bis; Seoul, South Korea; Ericsson; R1-091314, Mar. 2009, 8 pages.
"Restriction Requirement", U.S. Appl. No. 13/721,771, dated Mar. 16, 2015, 5 pages.
"Restriction Requirement", U.S. Appl. No. 14/031,739, dated Apr. 28, 2015, 7 pages.
"Signaling Support for PRS Muting in", 3GPP TSG RAN2 #70, Montreal, Canada; Ericsson, ST-Ericsson; R2-103102, May 2010, 2 pages.
"Some Results on DL-MIMO Enhancements for LTE-A", 3GPP TSG WG1 #55bis, R1-090328, Motorola; Ljubjana, Slovenia, Jan. 2009, 5 pages.
"Sounding RS Control Signaling for Closed Loop Antenna Selection", 3GPP TSG RAN #51, R1-080017—Mitsubishi Electric, Jan. 2008, 8 pages.
"Study on hearability of reference signals in LTE positioning support", 3GPP TSG RAN1 #56bisa—R1-091336, Seoul, South Korea, Mar. 2009, 8 pages.
"Supplemental Notice of Allowance", U.S. Appl. No. 14/488,709, dated Oct. 7, 2015, 8 pages.
"System Simulation Results for OTDOA", 3GPP TSG RAN WG4 #53, Jeju, South Korea, Ericsson, R4-094532;, Nov. 2009, 3 pages.
"Technical 1 34. Specification Group Radio Access Network; Evolved Universal Terrestrial Radio Access (E-UTRA);", 3GPP TS 36.211 v8.4.0 (Sep. 2008); 3rd Generation Partnership Project; Physical Channels and Modulation (Release 8), 2008, 78 pages.
"Technical Specification Group Radio Access Network", 3GPP TS 25.305 V8.1.0 (Dec. 2008) 3rd Generation Partnership Project; Stage 2 functional specification of User Equipment (UE) positioning in UTRAN (Release 8), 2008, 79 pages.
"Technical Specification Group Radio Access Network; Evolved Universal Terrestrial Radio Access (E-UTRA)", 3GPP TS 36.305 V0.2.0 (May 2009) 3rd generation Partnership Project; Stage 2 functional specification of User Equipment, (UE) positioning in E-UTRAN (Release 9);, 2010, 52 pages.
"Text 1 3 0. proposal on Orthonogonal PRS transmissions in mixed CP deployments using MBSFN subframes", 3GPP TSG RAN WG1 #59, Jeju, South Korea, Motorola, R1-095003;, Nov. 2009, 4 pages.
"Text proposal on measurements", 3GPP TSG RAN2 #60bis, Tdoc R2-080420; Motorola, Sevilla, Spain, Jan. 2008, 9 pages.
"Two Component Feedback Design and Codebooks", 3GPP TSG RAN1 #61, R1-103328, Motorola, Montreal, Canada, May 2010, 7 pages.
"Two-Level Codebook design for MU MIMO enhancement", 3GPP TSG RAN WG1 #60, R1-102904, Montreal, Canada, May 2010, 8 pages.
"UTRAN SFN-SFN observed lime 11 difference measurement & 3GPP TS 25.311 IE 10.3.7.106 "UE positioning OTDOA neighbour cell info' assistance data D fields"", 3GPP TSG RAN WG4 (Radio) #20, New Jersey, USA; Tdoc R4-011408,, Nov. 2001, 4 pages.
"View on the feedback framework for Rei. 1 0", 3GPP TSG RAN WG1 #61, R1-103026, Samsung, Montreal, Canada, May 2010, 15 pages.
"Views on Codebook Design for Downlink 8Tx MIMO", 3GPP TSG RAN WG1 #60. R1-101219, San Francisco, USA, Feb. 2010, 9 pages.
Colin,"Restrictions on Autonomous Muting to Enable 1 58. Time Difference of Arrival Measurements", U.S. Appl. No. 61/295,678, filed Jan. 15, 2010, 26 pages.

(56) References Cited

OTHER PUBLICATIONS

Costas,"A Study of a Class of Detection Waveforms Having Nearly Ideal Range-Doppler Ambiguity Properties", Fellow, IEEE; Proceedings of the IEEE, vol. 72, No. 8, Aug. 1984, 14 pages.
Guo,"A Series-Shunt Symmetric Swtich Makes Transmit-Receive Antennas Reconfigurable in Multipath Channels", IEEE 3d Int'l Conf. on Digital Object Identifier, May 29, 2011, pp. 468-471.
Jafar,"On Optimality of Beamforming for Multiple Antenna Systems with Imperfect Feedback", Department of Electrical Engineering, Stanford University, CA, USA, 2004, 7 pages.
Knoppert,"Communication Device", U.S. Appl. No. 29/329,028, filed Dec. 8, 2008, 10 pages.
Knoppert,"Indicator Shelf for Portable Electronic Device", U.S. Appl. No. 12/480,289, filed Jun. 8, 2009, 15 pages.
Krishnamurthy,"Interference Control, SINR Optimization and Signaling Enhancements to Improve the Performance of OTDOA Measurements", U.S. Appl. No. 12/813,221, filed Jun. 10, 2010, 20 pages.
Krishnamurthy,"Threshold Determination in TDOA-Based Positioning System", U.S. Appl. No. 12/712,191, filed Feb. 24, 2010, 19 pages.
MACCM"GaAs SP6T 2.5V High Power Switch Dual-/Tri-/Quad-Band GSM Applications", Rev. V1 data sheet, www.macomtech.com, Mar. 22, 2003, 5 pages.
Renesas,"uPG2417T6M GaAs Integrated Circuit SP6T Switch for NFC Application (R09DS0010EJ0100)", Rev. 1.00 data sheet, Dec. 24, 2010, 12 pages.
Sayana,"Method of Codebook Design and Precoder Feedback in Wireless Communication Systems", U.S. Appl. No. 61/374,241, filed Aug. 16, 2010, 40 pages.
Sayana,"Method of Precoder Information Feedback in Multi-Antenna Wireless Communication Systems", U.S. Appl. No. 61/331,818, filed May 5, 2010, 43 pages.
Valkonen,"Impedance Matching and Tuning of Non-Resonant Mobile Terminal Antennas", Aalto University Doctoral Dissertations, Mar. 15, 2013, 94 pages.
Visotsky,"Space—Time Transmit Precoding With Imperfect Feedback", IEEE Transactions on Information Theory, vol. 47, No. 6, Sep. 2001, pp. 2632-2639.
Vodafone"PDCCH Structure for MTC Enhanced Coverage", 3GPP TSG RAN WG1 #76, R1-141030, Prague, Czech Republic, Feb. 2014, 2 pages.
Yun,"Distributed Self-Pruning(DSP) Algorithm for Bridges in Clustered Ad Hoc Networks", Embedded Software and Systems; Lecture Notes in Computer Science, Springer, May 14, 2007, pp. 699-707.
Zhuang,"Method for Precoding Based on Antenna Grouping", U.S. Appl. No. 12/899,211, filed Oct. 6, 2010, 26 pages.
"Advisory Action", U.S. Appl. No. 13/692,520, dated Sep. 6, 2016, 3 pages.
"Corrected Notice of Allowance", U.S. Appl. No. 14/339,476, dated Sep. 13, 2016, 2 pages.
"Corrected Notice of Allowance", U.S. Appl. No. 14/339,476, dated Sep. 30, 2016, 2 pages.
"Non-Final Office Action", U.S. Appl. No. 13/692,520, dated Nov. 17, 2016, 7 pages.
"Non-Final Office Action", U.S. Appl. No. 14/445,715, dated Oct. 20, 2016, 43 pages.
"Notice of Allowance", U.S. Appl. No. 13/721,771, dated Oct. 26, 2016, 5 pages.
"Notice of Allowance", U.S. Appl. No. 14/150,047, dated Oct. 28, 2016, 8 pages.
"Corrected Notice of Allowance", U.S. Appl. No. 14/031,739, dated Jun. 8, 2016, 2 pages.
"Final Office Action", U.S. Appl. No. 13/692,520, dated May 26, 2016, 25 pages.
"Final Office Action", U.S. Appl. No. 13/733,297, dated Jul. 18, 2016, 17 pages.
"Final Office Action", U.S. Appl. No. 14/330,317, dated Jun. 16, 2016, 15 pages.
"Final Office Action", U.S. Appl. No. 14/445,715, dated Jul. 8, 2016, 31 pages.
"Non-Final Office Action", U.S. Appl. No. 13/721,771, dated May 31, 2016, 9 pages.
"Notice of Allowance", U.S. Appl. No. 14/280,755, dated Jul. 15, 2016, 5 pages.
"Notice of Allowance", U.S. Appl. No. 14/339,476, dated Jul. 18, 2016, 11 pages.
"Supplemental Notice of Allowance", U.S. Appl. No. 14/952,738, dated Jun. 9, 2016, 4 pages.
"International Preliminary Report on Patentability", Application No. PCT/US2015/033570, dated Jan. 26, 2017, 7 pages.
"Foreign Office Action", EP Application No. 14705002.5, dated Feb. 16, 2017, 7 pages.
"Corrected Notice of Allowance", U.S. Appl. No. 13/721,771, dated Feb. 10, 2017, 2 pages.
"Corrected Notice of Allowance", U.S. Appl. No. 13/721,771, dated Dec. 16, 2016, 2 pages.
"Corrected Notice of Allowance", U.S. Appl. No. 14/150,047, dated Dec. 16, 2016, 2 pages.
"Non-Final Office Action", U.S. Appl. No. 13/733,297, dated Jun. 22, 2017, 19 pages.
"Notice of Allowance", U.S. Appl. No. 13/692,520, dated Jun. 28, 2017, 22 pages.
"Final Office Action", U.S. Appl. No. 13/733,297, dated Dec. 28, 2017, 21 pages.
"Foreign Office Action", EP Application No. 14705002.5, dated Oct. 26, 2017, 6 pages.
"Foreign Office Action", Chinese Application No. 201480019733.8, dated Mar. 27, 2018, 16 pages.
"Notice of Allowance", U.S. Appl. No. 13/733,297, dated Feb. 8, 2018, 11 pages.
"Notice of Allowance", U.S. Appl. No. 15/787,312, dated Mar. 28, 2018, 17 pages.

\* cited by examiner

APPARATUS AND METHOD FOR BEAMFORMING TO OBTAIN VOICE AND NOISE SIGNALS

CROSS-REFERENCE TO RELATED APPLICATIONS

The present application claims priority to U.S. Provisional Patent Application No. 61/827,799, filed May 28, 2013, entitled "APPARATUS AND METHOD FOR BEAMFORMING TO OBTAIN VOICE AND NOISE SIGNALS IN A VOICE RECOGNITION SYSTEM," and further claims priority to U.S. Provisional Patent Application No. 61/798,097, filed Mar. 15, 2013, entitled "VOICE RECOGNITION FOR A MOBILE DEVICE," and further claims priority to U.S. Provisional Pat. App. No. 61/776,793, filed Mar. 12, 2013, entitled "VOICE RECOGNITION FOR A MOBILE DEVICE," all of which are assigned to the same assignee as the present application, and all of which are hereby incorporated by reference herein in their entirety.

FIELD OF THE DISCLOSURE

The present disclosure relates generally to voice processing and more particularly to beamforming systems and methods of applying dual or multi-input noise suppression.

BACKGROUND

Mobile devices such as, but not limited to, mobile phones, smart phones, personal digital assistants (PDAs), tablets, laptops or other electronic devices, etc., increasingly include voice recognition systems to provide hands free voice control of the devices. Although voice recognition technologies have been improving, accurate voice recognition remains a technical challenge when the voice of interest is in the presence of other talkers or ambient noise. These technical challenges exist not only for voice recognition technologies, but also for voice processing such as that used in telephony which today may be performed using almost any electronic device having a suitable telephony application, notwithstanding the prevalence of mobile phones and smart phones.

A particular challenge when implementing voice transmission or voice recognition systems on mobile devices is that many types of mobile devices support use cases where the user (and therefore the user's voice) may be at different positions relative to the mobile device depending on the use case. Adding to the challenge is that various noise sources including other talkers (i.e. jammer voices) may also be located at different positions relative to the mobile device. Some of these noise sources may vary as a function of time in terms of location and magnitude. All of these factors make up the acoustic environment in which a mobile device operates and impacts the sound picked up by the mobile device microphones. Also, as the mobile device is moved or is positioned in certain ways, the acoustic environment of the mobile device also changes accordingly thereby also changing the sound picked up by the mobile device's microphones. Voice sound that may be recognized by the voice recognition system or by a listener on the receiving side of a voice transmission system under one acoustic environment may be unrecognizable under certain changed conditions due to mobile device motion, positioning, or ambient noise levels. Various other conditions in the surrounding environment can add noise, echo or cause other acoustically undesirable conditions that also adversely impact the voice recognition system or voice transmission system.

More specifically, the mobile device acoustic environment impacts the operation of signal processing components such as microphone arrays, noise suppressors, echo cancellation systems and signal conditioning that is used to improve both voice recognition and voice call performance. For mobile devices and also for stationary devices, the speaker and other jammer speakers or other noise sources may also change locations with respect to the device microphones. This also results in undesirable impacts on the acoustic environment and may result in voice being unrecognizable by the voice recognition system or a listener due to noise interference caused by the jammer speakers or other noise sources.

DETAILED DESCRIPTION

Figure 1:
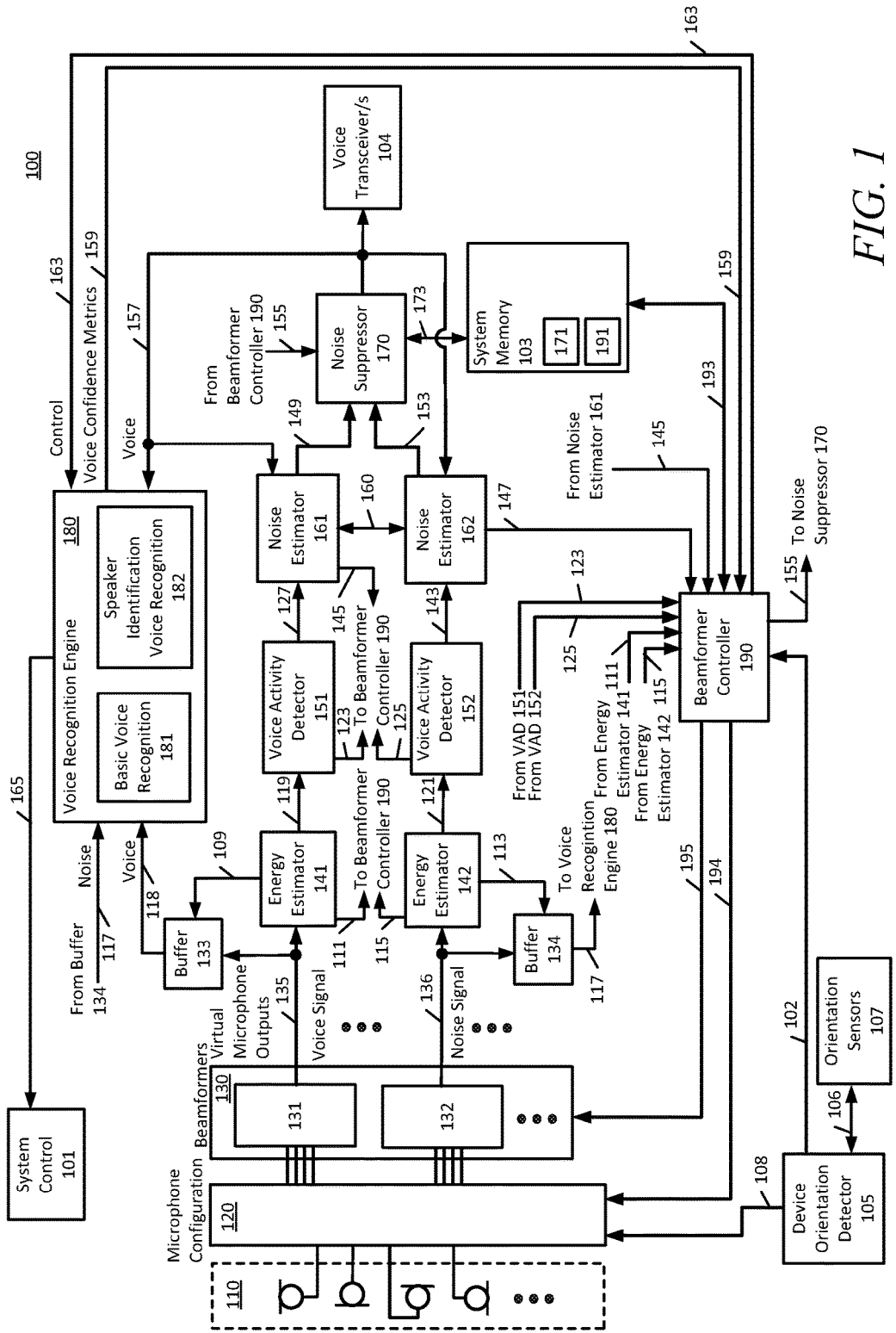
FIG. 1 is a schematic block diagram of an apparatus in accordance with the embodiments.

Briefly, a method of operation of the disclosed embodiments includes beamforming a plurality of microphone outputs to obtain a plurality of virtual microphone audio channels. Each virtual microphone audio channel corresponds to a beamform. The virtual microphone audio channels include at least one voice channel and at least one noise channel. The method includes performing voice activity detection on the at least one voice channel and adjusting a corresponding voice beamform until voice activity detection indicates that voice is present on the at least one voice channel.

The method may further include performing voice activity detection on the at least one noise channel and adjusting a corresponding noise beamform until voice activity detection indicates that voice is not substantially present on the at least one noise channel. The method may further include performing energy estimation on the at least one noise channel and adjusting a corresponding noise beamform until energy estimation indicates that the at least one noise channel is receiving audio from a dominant audio energy source. The method may further include performing voice recognition on the at least one voice channel and adjusting the corresponding voice beamform to improve a voice recognition confidence metric of the voice recognition. The method may further include performing voice recognition on the at least one noise channel and adjusting the corresponding noise beamform to decrease a voice recognition confidence metric of the voice recognition performed on the noise beam.

In some embodiments, performing voice recognition on the at least one noise channel may include performing voice recognition on the at least one noise channel using trained voice recognition that is trained to identify a specific speaker. The method may further include configuring the plurality of microphone outputs initially based on a detected orientation of a corresponding group of microphones.

Another method of operation of the disclosed embodiments includes beamforming a plurality of microphone outputs to obtain a plurality of virtual microphone audio channels, where each virtual microphone audio channel corresponds to a beamform, and with at least one voice channel and at least one noise channel. The method includes performing voice recognition on the at least one voice channel and adjusting the corresponding voice beamform to improve a voice recognition confidence metric of the voice recognition.

In some embodiments, performing voice recognition on the at least one voice channel may include performing voice recognition on the at least one voice channel using trained voice recognition that is trained to identify a specific speaker. The method may further include performing voice activity detection on the at least one noise channel and adjusting a corresponding noise beamform until voice activity detection indicates that voice is not substantially present on the at least one noise channel. The method may further include performing energy estimation on the at least one noise channel and adjusting the corresponding noise beamform until energy estimation indicates that the at least one noise channel is receiving audio from a dominant audio energy source. The method may further include performing voice activity detection on the at least one noise channel and adjusting a corresponding noise beamform until voice activity detection indicates that voice is present on the at least one noise channel. The method may further include performing voice recognition on the at least one noise channel and adjusting the corresponding noise beamform to decrease a voice recognition confidence metric of the voice recognition. The method may further include performing voice recognition on the at least one noise channel using trained voice recognition that is trained to identify a specific speaker. The method may further include performing voice recognition on the at least one noise channel in response to voice activity detection indicating that voice is present on the at least one noise channel. The method may further include adjusting the corresponding noise beamform to decrease a voice recognition confidence metric of the trained voice recognition.

The disclosed embodiments also provide an apparatus that includes a beamformer, operatively coupled to a plurality of microphone outputs. The beamformer is operative to provide, as beamformer outputs, a plurality of virtual microphone audio channels where each virtual microphone audio channel corresponds to a beamform and with at least one voice channel and at least one noise channel. A beamformer controller is operatively coupled to the beamformer and is operative to monitor the at least one voice channel and the at least one noise channel to determine if voice is present on either of the at least one voice channel or the at least one noise channel. The beamformer controller is also operative to control the beamformer to adjust a beamform corresponding to the at least one voice channel until voice is present on the at least one voice channel. In some embodiments, the beamformer controller is also operative to control the beamformer to adjust a beamform corresponding to the at least one noise channel until voice is not substantially present on the at least one noise channel.

In one embodiment, a voice activity detector is operatively coupled to the beamformer to receive the at least one voice channel, and to the beamformer controller. The beamformer controller of this embodiment is operative to monitor the at least one voice channel to determine if voice is present by monitoring input received from the voice activity detector. In another embodiment, a voice recognition engine is operatively coupled to the beamformer to receive the at least one voice channel, and to the beamformer controller. The voice recognition engine is operative to perform voice recognition on the at least one voice channel to detect voice, and the beamformer controller is operative to monitor the at least one voice channel to determine if voice is present by monitoring input received from the voice recognition engine. The input may be, for example, voice confidence metrics.

In another embodiment, a voice recognition engine is operatively coupled to the beamformer to receive the at least one voice channel and at least one noise channel. The voice recognition engine is operative to perform voice recognition on the at least one voice channel and at least one noise channel to detect voice. A beamformer controller is operatively coupled to the beamformer, to a voice activity detector and to the voice recognition engine. The beamformer controller is operative to, among other things, monitor the voice activity detector to determine if voice is present on either of the at least one voice channel or the at least one noise channel and control the beamformer to adjust a corresponding voice beamform until voice activity detection or the voice recognition engine indicates that voice is present on the at least one voice channel and adjust a corresponding noise beamform until voice activity detection or the voice recognition engine indicates that voice is not substantially present on the at least one noise channel.

In some embodiments, the apparatus may also include an energy estimator, operatively coupled to the beamformer and to the voice activity detector. In some embodiments, the apparatus may further include microphone configuration logic, operatively coupled to the beamformer. The microphone configuration logic may include switch logic that is operative to switch any microphone output of the plurality of microphone outputs on or off. In some embodiments, the apparatus may also include a noise estimator, operatively coupled to the voice activity detector.

In another embodiment, a method of operation includes beamforming a plurality of microphone outputs to obtain at least one virtual microphone channel, performing voice recognition on the at least one virtual microphone channel, and adjusting a corresponding beamform until voice recognition indicates one of the presence of voice one the at least one virtual microphone channel or that voice is not substantially present on the at least one virtual microphone channel. In some embodiments, performing voice recognition may include performing voice recognition on the at least one virtual microphone channel using trained voice recognition that is trained to identify a specific speaker.

Turning now to the drawings, FIG. 1 is a schematic block diagram of an apparatus 100 in accordance with various embodiments. The apparatus 100 may be incorporated into and used in any electronic device that employs voice-recognition, voice transmission, or voice capture. One application of the apparatus 100 may be used in any of various mobile devices such as, but not limited to, a mobile telephone, smart phone, camera, video camera, tablet, laptop, or some other battery-powered electronic device, etc., however the apparatus 100 is not limited to use in mobile devices. For example, the apparatus 100 may be used in voice controlled television sets, digital video recorders, automobile control systems, or any other device or system that employs voice recognition or voice communication, such as portable or non-portable telephones, speakerphones, etc.

It is to be understood that FIG. 1 is limited, for the purpose of clarity, to showing only those components useful to describe the features and advantages of the various embodiments, and to describe how to make and use the various embodiments to those of ordinary skill. It is therefore to be understood that various other components, circuitry, and devices etc. may be present in order to implement an apparatus and that those various other components, circuitry, devices, etc., are understood to be present by those of ordinary skill. For example, the apparatus may include inputs for receiving power from a power source, a power distribution bus that may be connected to a battery or other power source housed within one of the electronic devices or systems in which the apparatus 100 is incorporated, to provide power to the apparatus 100 or to distribute power to the various components of the apparatus 100. In another example, the apparatus may include one or more communication buses for sending control signals or other information between operatively coupled components, etc. Thus it is to be understood that such various other components, circuitry, or devices are omitted for the purpose of clarity.

Another example is that the apparatus 100 may also include an internal communication bus, for providing operative coupling between the various components, circuitry, and devices. The terminology "operatively coupled" as used herein refers to coupling that enables operational and/or functional communication and relationships between the various components, circuitry, devices etc. described as being operatively coupled and may include any intervening items (i.e. buses, connectors, other components, circuitry, devices etc.) used to enable such communication such as, for example, internal communication buses such as data communication buses or any other intervening items that one of ordinary skill would understand to be present. Also, it is to be understood that other intervening items may be present between "operatively coupled" items even though such other intervening items are not necessary to the functional communication facilitated by the operative coupling. For example, a data communication bus may be present in various embodiments of the apparatus 100 and may provide data to several items along a pathway along which two or more items are operatively coupled, etc. Such operative coupling is shown generally in FIG. 1 described herein.

In FIG. 1 the apparatus 100 may include a group of microphones 110 that provide microphone outputs and that are operatively coupled to microphone configuration logic 120. Although the example of FIG. 1 shows four microphones, with each oriented in a different direction, the embodiments are not limited to four microphones or the example orientations shown and any number of microphones and microphone orientations may be used in the embodiments. It is to be understood that the group of microphones 110 are shown using a dotted line in FIG. 1 because the group of microphones 110 is not necessarily a part of the apparatus 100. In other words, the group of microphones 110 may be part of a mobile device or other electronic device or system into which the apparatus 100 is incorporated. In that case, the apparatus 100 is operatively coupled to the group of microphones 110, which are located within the mobile device, by a suitable communication bus or suitable connectors, etc., such that the group of microphones 110 are operatively coupled to the microphone configuration logic 120.

The microphone configuration logic 120 may include various front end processing, such as, but not limited to, signal amplification, analog-to-digital conversion/digital audio sampling, echo cancellation, etc., which may be applied to the group of microphone 110 outputs prior to performing additional, less power efficient signal processing such as noise suppression. In some embodiments, the microphone configuration logic 120 may also include switch logic operatively coupled to the group of microphones 110 and operative to respond to control signals to individually turn each of the microphones on or off to configure the microphones in various ways. Alternatively, in some embodiments, the microphones may be turned on or off by adjusting a gain or amplifier associated with a corresponding microphone output. For example, a microphone may be turned off by reducing a gain value to zero for the corresponding microphone output. Additionally, in some embodiments, the microphone configuration logic 120 may be operative to receive control signals from other components of the apparatus 100 to adjust front end processing parameters such as, for example, amplifier gain.

The microphone configuration logic 120 is operatively coupled to beamformer 130. In some embodiments, the beamformer 130 may be implemented as a single beamformer with multiple outputs. Each output of the beamformer 130 represents a virtual microphone signal where the virtual microphone is created by beamforming the outputs from one or more physical microphones of the group of microphones 110. In the example embodiment illustrated by FIG. 1, the beamformer 130 is implemented as two or more separate beamformers, beamformer 131 and beamformer 132 in order to increase the speed of operation. Each beamformer 131 and 132 receives inputs from the group of microphones 110 based on the microphone configuration logic 120 or by selecting microphone outputs as needed for given beamform patterns by beamformer controller 190 or by the beamformers independently. That is, in some embodiments, switch logic of microphone configuration logic 120 may switch some or all microphone outputs to beamformer 131 and some or all to beamformer 132 in various combinations and configurations, or in other embodiments the beamformer controller 190, or the beamformers independently, may control which microphones are used as needed for given beamform patterns and may turn microphones on or off by adjusting gain applied within the beamformers. For example, in a mobile device application of the apparatus 100, microphones may be configured by either switch logic, by the beamformer controller 190 or by the beamformers, based on the orientation of the mobile device.

In some embodiments, a device orientation detector 105 is operatively coupled to the microphone configuration logic 120 and to one or more orientation sensors 107. One example of an orientation sensor is a gyroscope, from which the device orientation detector 105 may receive sensor data over connection 106 and determine the positioning of the mobile device. For a given orientation, the device orientation detector 105 may send control signal 108 to the microphone configuration logic 120 to turn off or turn on certain microphones of the group of microphones 110. In other words, various mobile device use cases or mobile device orientations may be associated with certain microphone configurations and such microphone configurations may be triggered by actions taken on the device in conjunction with device orientations. This may be based on pre-determined configuration settings for given orientations in some embodiments, or may be based on other or additional criteria in other embodiments. For example, placing a device in a docking station may trigger engaging a pre-determined microphone configuration. In another example, placing the device in a speakerphone mode and placing the device on a tabletop or desktop may trigger another pre-determined microphone configuration. Thus in some embodiments, the device orientation detector 105, when present, may send orientation information 102 to the beamformer controller 190 such that the beamformer controller 190 may control or override such use case or orientation related settings of the microphone configuration logic 120.

The example apparatus 100 embodiment of FIG. 1 includes two voice detection paths, one for each virtual microphone output of each beamformer 131 and 132. Although the example of FIG. 1 shows two virtual microphone outputs, voice signal 135 and noise signal 136, any number of virtual voice or noise signals may be generated in the various embodiments. In the present example, each of the two virtual microphone outputs is, when needed, provided to a dual input noise suppressor 170. In other embodiments that utilize multiple voice and/or noise signals, a multiple input noise suppresser may be used. In another embodiment, multiple two-input noise suppressors may be used in series to produce a single de-noised output signal. In yet other embodiments, multiple two-input noise suppressors or multiple multi-input noise suppressors may be used in parallel and each output may be sent to the voice recognition engine 180. In such embodiments, whichever output produces the best trained or untrained voice confidence metric may be utilized.

Two symmetrical paths exist between the respective beamformers 131 and 132 and the noise suppressor 170; one for virtual microphone voice signal 135 and one for virtual microphone noise signal 136. The two paths are symmetrical in that they each employ a respective energy estimator 141 and 142 operatively coupled to the beamformers 131 and 132, a respective voice activity detector (VAD) 151 and 152 operatively coupled to the energy estimators 141 and 142, and a noise estimator 161 and 162 operatively coupled to the VAD 151 and 152, respectively. The two noise estimators 161 and 162 are operatively coupled to the noise suppressor 170 to provide respective control signals 149 and 153. The noise estimator 162 receive control signal 143 from VAD 152. The two pathways, including all the components described above, may be considered as a "voice channel" and "noise channel." That is, a voice signal and a noise signal are sent along the respective pathways through the various components along with control signals between components when appropriate. The voice signal or noise signal may be passed along the pathways and through some of the components without any processing or other action being taken by that component in some embodiments. The voice channel and noise channel are virtual channels that are related to a corresponding voice beamform and noise beamform. The voice beamform may be created by beamformer 131 and the noise beamform may be created by beamformer 132. The voice signal 135 may be considered a voice channel which may also be considered to be one of the virtual microphone outputs. The noise signal 136 may be considered to be noise channel which may also be considered to be another one of the virtual microphone outputs. The "virtual microphones" correspond to beamforms that may incorporate audio from one or more physical microphones of the group of microphones 110. Although FIG. 1 provides an example of one "voice channel" and one "noise channel," any number of voice channels or noise channels may be created and used in the various embodiments. Also, the various channel components, in some embodiments, may be single integrated components that perform operations for one or more channels. For example, energy estimator 141 and energy estimator 142 may be integrated as a single energy estimator that serves both the voice channel and the noise channel by providing dual inputs or in a time domain multiple access approach or some other suitable approach. The VAD 151 and VAD 152 or the noise estimator 161 and noise estimator 162 may also be implemented in an integrated manner in some embodiments.

Each virtual microphone output is operatively coupled to a respective buffer 133 and 134 which may be a circular buffer to store voice data or noise data while signal examination on the pathways is taking place. That is, signal data may be stored while the signals are being examined to determine if voice is actually present or not in the signals. Thus the signal is buffered as a signal of interest so that if voice or noise is determined to be present the signal can be processed or used accordingly. For example, in some embodiments, voice and noise signals from the beamformers 130 may be buffered and sent to the voice recognition engine 180 while the beamformers 130 continue to adjust beamform patterns to improve the voice and noise signals.

For purposes of explanation, the voice signal 135 pathway will be described first in detail. The symmetrical pathway for the noise signal 136 operates in a similar manner, and any differences will be addressed below. Therefore, beginning with voice signal 135, the energy estimator 141 is operatively coupled to the buffer 133 and to VAD 151. The energy estimator 141 provides a control signal 109 to the buffer 133, a voice and control signal 119 to the VAD 151 and a control signal 111 to the beamformer controller 190. The noise signal 136 energy estimator 142 provides a control signal 113 to buffer 134. In some embodiments, the buffer 133 and buffer 134 may each be controlled by VAD 151 and VAD 152, respectively, and energy estimator 141 and energy estimator 142 may not be present. That is, in some embodiments, VAD 151 and VAD 152 are used to detect voice energy in respective beamform patterns generated by beamformers 130 rather than initially looking for unspecific audio energy as when using the energy estimators. In other embodiments, the VAD may be omitted and, instead, the voice recognition engine 180 and voice confidence metrics alone (without the VAD) may be used as an indicator of the presence of voice in signal. These operations are discussed further herein below with respect to various embodiments and various related methods of operation.

The VAD 151 is further operatively coupled to a noise estimator 161 and provides a voice and control signal 127. The VAD 151 is operatively coupled to the beamformer controller 190 and provides control signal 123 which informs the beamformer controller 190 when the VAD 151 has detected voice. The noise estimator 161 may be a signal-to-noise ratio (SNR) estimator in some embodiments, or may be some other type of noise estimator. The noise estimator 161 is operatively coupled to the beamformer controller 190 and provides control signal 145 which informs the beamformer controller 190 when noise suppression is required for the voice signal 135. In other words, control signal 145 provides information to the beamformer controller 190 which in turn controls the beamformer 131 so that the beamformer 131 may continue to scan or may adjust the beamform pattern in order to reduce some of the noise contained in the voice signal.

Each of the components VAD 151 and 152 and noise estimator 161 and 162, may all be operatively coupled to the respective buffer 133 and buffer 134, to receive buffered voice signal 118 or buffered noise signal 117, respectively. Noise suppressor 170 may be operatively coupled to both buffer 133 and buffer 134 to receive both the buffered voice signal 118 and the buffered noise signal 117. These connections are not shown in FIG. 1 for clarity in showing the various other control connections, etc.

Therefore, noise estimator 161 may receive the buffered voice signal 118 from the buffer 133 and provides control signal 145 to the beamformer controller 190, and voice and control signal 149 to noise suppressor 170. Noise estimator 161 is also operatively coupled to noise estimator 162 by control and data connection 160 such that the two noise estimators can obtain and use information from the other channel to perform various noise estimation operations in some embodiments. The noise suppressor 170 is operatively coupled to the voice recognition engine 180 to provide a noise suppressed voice signal 157, to the beamformer controller 190 to receive control signal 155, and to system memory 103 by read-write connection 173. The noise suppressor 170 may access system memory 103 to read and retrieve noise suppression algorithms, stored in noise suppression algorithms database 171, for execution by the noise suppressor 170. The beamformer controller 190 is operatively coupled to system memory 103 by a read-write connection 193 to access pre-determined beamform patterns stored in a beamform patterns database 191. The system memory 103 is a non-volatile, non-transitory memory.

The noise suppressor 170 may receive the buffered voice signal 118 from the buffer 133 and provide a noise suppressed voice signal 157 to the voice recognition engine 180 and/or to one or more voice transceivers 104 in some embodiments. In some embodiments, the voice recognition engine 180 may not be used and may not be present. That is, in some embodiments, the noise suppressed voice signal 157 may only be provided to one or more voice transceivers 104 for transmission on either by a wired or wireless telecommunications channel or over a wired or wireless network connection if a voice over Internet protocol (VoIP) system is employed by the device into which the apparatus 100 is incorporated. In embodiments having the voice recognition engine 180 present, the voice recognition engine 180 may be operatively coupled to the system control 101, which may be any type of voice controllable system control depending on the device in which the apparatus 100 is incorporated such as, but not limited to, a voice controlled dialer of a mobile telephone, a video recorder system control, an application control of a mobile telephone, smartphone, tablet, laptop, in-vehicle control system, etc., or any other type of voice controllable system control. However, the system control 101 may not be present in all embodiments. The voice recognition engine includes basic voice recognition (VR) logic 181 that recognizes human speech. In some embodiments, the voice recognition engine 180 may additionally, or alternatively, include speaker identification voice recognition logic (SI-VR) 182 which is trained to recognize specific human speech, such as the speech of a specific user.

A control signal 163, sent by the beamformer controller 190, may invoke either the VR logic 181 or the SI-VR logic 182. In response to the control signal 163 instructions, either the VR logic 181 or the SI-VR logic 182 will read either, or both of, the buffered noise signal 117 or buffered voice signal 118. The voice recognition engine 180 will provide a voice-to-text stream with corresponding voice confidence metrics on each phrase or group of words as an indication (i.e. a confidence score) to the beamformer controller 190 of the likelihood of recognized human speech, or the likelihood of a specific user's speech if the SI-VR logic 182 has been invoked. This indication is shown in FIG. 1 as voice confidence metrics 159. The voice recognition engine 180 may also send control signal 165 to the system control 101 in response to detected command words, command phrases or other speech (such as for speech-to-text applications) received on the voice signal 157 or on the buffered voice signal 118 in some embodiments in which the voice recognition engine 180 is also used as a control function for the apparatus 100.

In the various embodiments, the beamformer controller 190 is operative to monitor various control signals which provide various indications of conditions on the voice signal 135 and noise signal 136. In response to the conditions, the beamformer controller 190 is operative to make adjustments to the beamformers 130 to change the beamform directivity. For example, the beamformer controller 190 attempts to adjust the beamformer 131 until the voice signal 135 is substantially the user's voice. Additionally, the beamformer controller 190 attempts to adjust the beamformer 132 until the noise signal 136 is tied to noises and sounds in the acoustic environment of the user other than the user's voice such as a jammer voice or voices or other environmental background noise.

In some embodiments, the formation of a single beamform may be sufficient in some situations. For example, by using a VAD, VR logic 181 or the SI-VR logic 182 (i.e. trained VR) to form a voice beamform channel along with using a noise suppressor may provide sufficient fidelity and de-noising for a given application or for a given acoustic environment. Also, a noise beamform channel using trained VR to substantially eliminate the user's voice and using a noise suppressor may also provide sufficient fidelity and de-noising for a given application or for a given acoustic environment.

The beamformer controller 190 is operative to configure the group of microphones 110 which may be accomplished in some embodiments by controlling the microphone configuration logic 120 to turn microphones on or off according to device orientation detected by device orientation detector 105, or other conditions. In some embodiments, the beamformer controller 190 may generate random beamforms for the voice or noise signal paths where the appropriate signal path components check the results of each. In other embodiments, the beamformer controller 190 may cause the virtual microphone beamforms to change such that the beamforms pan or scan an audio environment until desired conditions are obtained. In yet other embodiments, the beamformer controller 190 may configure the beamformers 130 using pre-determined beamform patterns stored in a beamform patterns database 191 stored in system memory 103. In yet other embodiments, beamformer 131 and beamformer 132 may be adaptive beamformers that are operative to determine the magnitude and phase coefficients needed to combine microphone outputs of the group of microphones 110 in order to steer a beam or a null in a desired direction. In the various embodiments, the beamformer controller 190 is operative to, and may, monitor control signals from any of the following components, in any combination, such as control signal 111 received from energy estimator 141, control signal 115 from energy estimator 142, control signal 123 from VAD 151, control signal 125 from VAD 152, control signal 145 from noise estimator 161 and/or control signal 147 from noise estimator 162. The beamformer controller 190 may also receive voice confidence metrics 159 from the voice recognition engine 180. The beamformer is operative to send a control signal 155 to noise suppressor 170 to invoke noise suppression under certain conditions that are described herein. In some embodiments, the beamformer controller 190 may be integrated into beamformers 130 such that beamformers 130 include all the features of the beamformer controller.

The disclosed embodiments employ VAD 151 and VAD 152 to distinguish voice activity from noise (and vice versa) and accordingly send respective control signals 123 and 125 to the beamformer controller 190. The embodiments also utilize noise estimator 161 and noise estimator 162 to determine when to enable or disable noise reduction if voice cannot be properly distinguished from the signal.

The beamformer 190 accordingly adjusts the beamform directivity of beamformer 131 and beamformer 132 based on energy levels detected by energy estimator 141 and energy estimator 142, voice activity as determined by VAD 151 or VAD 152, and the noise estimators 161 and 162. That is, if the energy level detected exceeds a threshold, the VAD looks for voice. If voice is not detected, the beamformer 190 may adjust the respective beamform pattern. If voice is detected, the noise estimator looks to determine if noise suppression is required or if the signal is sufficient as is. If noise suppression is needed, the beamformer 190 may send control signal 155 to activate the noise suppressor 170 and to perform a voice confidence metric test on the voice signal 157 by the voice recognition engine 180.

Thus, the energy estimators 141 and 142 are operative to detect deviations from a baseline that may be an indicator of voice being present in a received audio signal, or to identify if the beamformers 131 and 132 have a high sensitivity portion of their respective beamforms in a direction of a dominant energy source which may be the primary background noise. If such deviations are detected, the energy estimator 141 may send control signal 119 to activate VAD 151 to determine if voice is actually present in the received audio signal. Short-term deviations exceeding a threshold may also invoke sending control signal 109 to buffer 133 to invoke buffering the signal.

Figure 2:
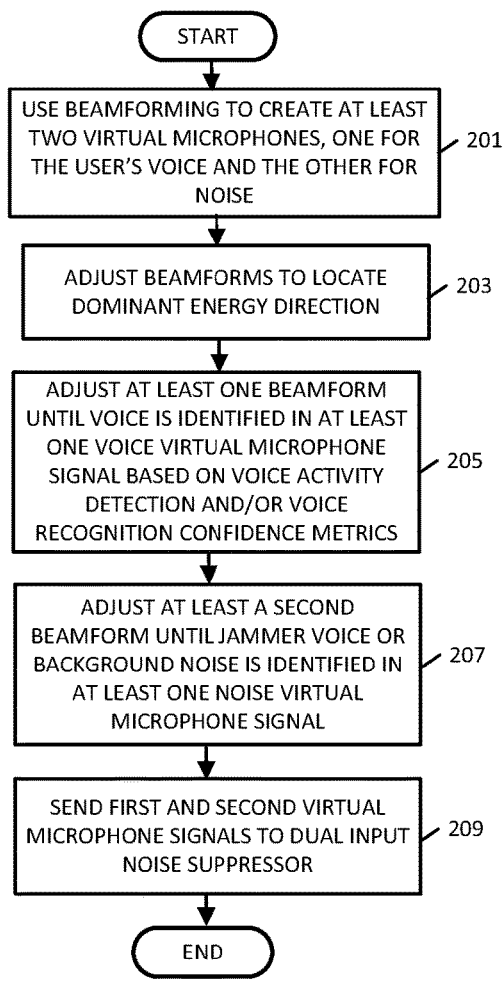
FIG. 2 is a flow chart providing an example method of operation of the apparatus of FIG. 1 in accordance with various embodiments.

An example method of operation of the apparatus 100 may be understood in view of the flowchart of FIG. 2. The method of operation begins in operation block 201 in which the apparatus 100 uses beamforming to create at least two virtual microphones. One virtual microphone is for the user's voice and the other virtual microphone is for noise. For example as shown in FIG. 1, beamformer 131 outputs the virtual microphone voice signal 135 and beamformer 132 outputs the virtual microphone noise signal 136. In operation block 203, the beamformer controller 190 adjusts one or both of the beamforms to locate dominant energy directions. For example, in some embodiments, the energy estimator 141 may detect an energy level above a threshold and accordingly send the control signal 111 to the beamformer 190 to inform the beamformer controller 190 that a high energy level has been detected. However, in embodiments that do not require the energy estimator 141, the VAD 151 is used to detect voice activity initially instead. Also in some embodiments, a timeout timer may be used such that, if no energy is detected by the energy estimator within a given time period, the beamformer controller 190 may proceed to change the beamform in order to search for a dominant energy source by, for example, employing an adaptive beamformer to determine the magnitude and phase coefficients to steer a beam or a null toward a dominant energy source. In one example of operation, one beamform may be steered in the direction of the user's voice to form the virtual microphone voice channel, and a null may be steered in the direction of the user's voice to form the virtual microphone noise channel.

Acoustic textbook beam-patterns for differential dual-microphone arrays include bidirectional, hyper-cardioid, and cardioid shapes, whose polar patterns have infinite depth nulls. In typical physical systems, the phase and magnitude mismatches between microphone signals are influenced by various factors such as hardware, A/D converter precision, clocking limitations etc. The physical separation distance between microphones and their surrounding structure further reduces the depth of these nulls. In typically realized broad-band signal systems, the null depth of a cardioid pattern may be as little as 10 dB, or as high as 36 dB. Therefore, if a null is directed toward the only jammer talker or noise source present, the expected attenuation of that noise source or jammer could be as least 10 to 12 dB. Note that with perfectly matched microphones and signal processing channels, the attenuation can be much higher. If there are multiple jammer talkers or noise sources oriented in multiple directions, the maximum attenuation realizable with only one steerable null will be less than this 10 to 12 dB value. In one embodiment, in order to form a noise beam, the beamformer controller (190) can steer a null at a desired voice. The desired voice will be attenuated by the aforementioned amounts, and the noise beam will thus be substantially noise. In another embodiment, in order to form a voice beam, the beamformer controller (190) can steer a null at a jammer talker source. The resulting signal will then be substantially voice, having only a small component of jammer signal, as it was attenuated by the aforementioned amount. In yet another embodiment, in the case of a diffused sound field, the beamformer controller (190) can orient a hypercardioid beamform in the direction of a desired talker, thereby forming a signal that is substantially voice due to the −6 dB random energy efficiency of the beam pattern relative to that of an omnidirectional microphone.

In operation block 205, the beamformer controller 190 adjusts at least one beam form until voice is identified on at least one voice virtual microphone signal based on verification by voice activity detection and/or voice recognition confidence metrics. In one example, VAD 151 or VAD 152 will be invoked to determine whether voice is present in the signal or not. For example, if VAD 151 does not detect voice in the signal, then VAD 151 may send control signal 123 to the beamformer controller 190 to indicate that the beamformer controller 190 should re-adapt, or in some other way continue to search for voice by changing the beamform accordingly.

In operation block 207, the beamformer controller 190 adjusts at least a second beamform until either a jammer voice or background noise is identified in at least one noise virtual microphone signal. For example, in one embodiment, VAD 152 may be used to determine whether voice is present in the noise signal 136 or not. In some embodiments, for situations where the VAD 152 detects that voice is present, the VAD 152 may send control signal 125 to beamformer controller 190 to invoke usage of the voice recognition engine 180 to further refine the voice detection. For example, the beamformer controller 190 may send control signal 163 to the voice recognition engine 180 to command the SI-VR 182 logic to analyze the buffered noise signal 117 and determine if any voice detected is that of the user. If the user's voice is detected, based on the voice confidence metrics 159 returned to the beamformer controller 190, the beamformer controller 190 may change the beamform to look for another dominant energy source (i.e. continue to search for noise). If the user's voice is not detected by the SI-VR 182 logic, then in some embodiments the voice activity detected by VAD 152 may be assumed to be jammer voices (i.e. a noise source). Also, if the voice activity detector VAD 152 does not detect voice, then the control signal 125 may indicate to the beamformer controller 190 that only background noise has been detected in the noise signal 136 and that therefore, in either of the above example scenarios the search for a noise source (with either ambient noise, jammer voices, or both) was successful.

In operation block 209, the first and second virtual microphone signals are sent to a dual input noise suppressor. Under certain conditions, the virtual microphone outputs will be sent to the noise suppressor 170. In other words, in some instances, the beamforming of the voice signal 135 may produce an adequately de-noised voice signal such that further noise suppression is not required. The noise estimators 161 and 162 make a determination of whether noise suppression is required or not. That is, the noise estimators 161 and 162 determine whether noise suppression is required for the voice recognition engine 180 to function properly, or if the user's voice will be sufficiently understood by far end listeners (because it has sufficiently little background noise). For example, if voice confidence metrics are too low for the voice signal, then the noise suppressor 170 may need to be applied. In accordance with the embodiments, the beamformed virtual microphone voice signal and the beamformed virtual microphone noise signal are therefore used as inputs to a noise suppressor. That is, once the noise signal 136 is determined to contain only background noise as was described above, or is found to contain a jammer's voice, then the noise signal 136 may be considered adequate for use as an input to the noise suppressor and the beamformer controller 190 will send control signal 155 to noise suppressor 170 to proceed with the dual input noise suppression procedures. The method of operation then ends as shown.

Figure 3:
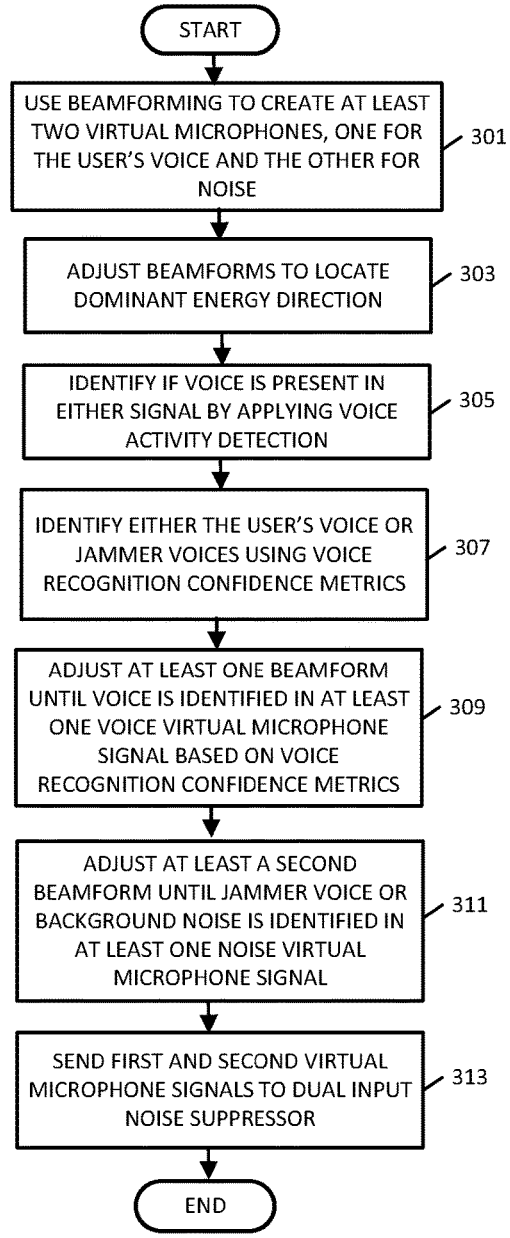
FIG. 3 is a flow chart showing another example method of operation of the apparatus of FIG. 1 in accordance with various embodiments.

FIG. 3 is a flow chart showing another example method of operation of the apparatus of FIG. 1 in accordance with various embodiments. The method of operation begins and in operation block 301, beamforming is used to create at least two virtual microphones, one for user voice and the other for noise. In operation block 303, the beam forms are adjusted to locate dominant energy source directions. In operation block 305, voice activity detectors are used to identify if voice is present in either signal. In operation block 307, voice recognition confidence metrics are used to identify whether any voice detected is the user's voice or is a jammer voice such that the signal may considered to be noise.

In operation block 309, at least one beamform is adjusted until voice is identified in at least one voice virtual microphone signal based on the voice recognition confidence metrics. In operation block 311, at least a second beamform is adjusted until a jammer voice or background noise is identified in at least one noise virtual microphone signal. In operation block 313, the first and second virtual microphone signals are sent to a dual input noise suppressor, and the method of operation ends as shown.

Further details of operation for obtaining the voice and noise microphone virtual signals and related beamforms are illustrated in FIG. 4 through FIG. 8. Beginning with FIG. 4, a flowchart shows an example method of operation related to formation of a virtual microphone and related beamform to obtain a voice signal in accordance with various embodiments. Initially, the apparatus 100 may determine the orientation of the electronic device or system that incorporates the apparatus 100. For some systems that are relatively stationary, these operations may be omitted since the physical position of the device may be relatively constant. For example, a digital video recorder or television set located in a certain position within a room may remain relatively constant. However, for applications where the apparatus 100 is incorporated into a mobile device, the orientation of the mobile device will change the acoustic environment perceived by the group of microphones 110. Therefore, advantages may be obtained by changing the microphone 110 configuration according to the mobile device orientation. Therefore in some embodiments, the method of operation begins as shown in decision block 401, where device orientation detector 105 may communicate with orientation sensors 107 and obtain the orientation of the device. The orientation information may be sent as orientation information 102 to the beamformer controller 190. In some embodiments, the device orientation detector 105 may send control signal 108 to microphone configuration logic 120 and adjust the microphone configuration accordingly. However, in other embodiments, the beamformer controller 190 will take on this role and will send control signal 194 to microphone configuration logic 120 and change the microphone configuration according to the received orientation information 102. These operations are illustrated in operation block 403.

If orientation information is not available, or is not relevant for the particular device in which the apparatus 100 is incorporated, the method of operation proceeds to operation block 405. In operation block 405, some or all of the microphones, of the group of microphones 110, are combined through the beamformer 130. After the microphone configuration has been selected in either operation block 403 or operation block 405, the method of operation proceeds to decision block 407. The decision of whether noise suppression is required, in decision block 407, is based on the results of the evaluation of noise estimator 161 which evaluates the noise level on the voice signal 135 or the noise level in the user's environment of the signal-to-noise ratio of the user's speech in the user's acoustic environment. If the noise estimator 161 determines that noise suppression is not required in decision block 407, then the control signal 145 will be sent to the beamformer controller 190 to indicate that the current beamform is adequate. In some embodiments, the voice signal may therefore be used for various applications as-is without further noise suppression and the method of operation ends. However, if noise suppression is required in decision block 407, then the resulting noise and voice virtual microphone signals are sent to the noise suppressor 170 in operation block 409.

More particularly, noise estimator 161 sends voice and control signal 149 to the noise suppressor 170. The noise suppressor 170 may obtain the buffered voice signal 118 from buffer 133 and may obtain the buffered noise signal 117 from buffer 134. The noise suppressor 170 may access the system memory 103 over read-write connection 173, and obtain a pertinent noise suppressor algorithm from the noise suppressor algorithms database 171. In some embodiments, the beamformer controller 190 may send the control signal 155 to noise suppressor 170 to indicate a noise suppressor algorithm from the database of noise suppressor algorithms 171 that the noise suppressor 170 should execute.

The noise estimator 161 may check the noise suppressor 170 voice signal 157 to determine if the applied noise suppression algorithm was adequate. If the noise suppression was adequate, and if noise suppression is therefore no longer required in decision block 411, the method of operation ends. However, if noise suppression is still required in decision block 411, then the voice signal 157 may be sent to the voice recognition engine 180. In response, the voice recognition engine will send voice confidence metrics 159 to the beamformer controller 190. If the confidence scores are too low, then the beamformer controller 190 may determine that noise suppression is still required in decision block 415. If the confidence scores are sufficiently high in decision block 415, the noise suppression is no longer required and the method of operation ends. If noise suppression is still required in decision block 415, then the control signal 163 may invoke SI-VR 182 to determine if the user's voice is present in the signal. The method of operation then ends.

Figure 4:
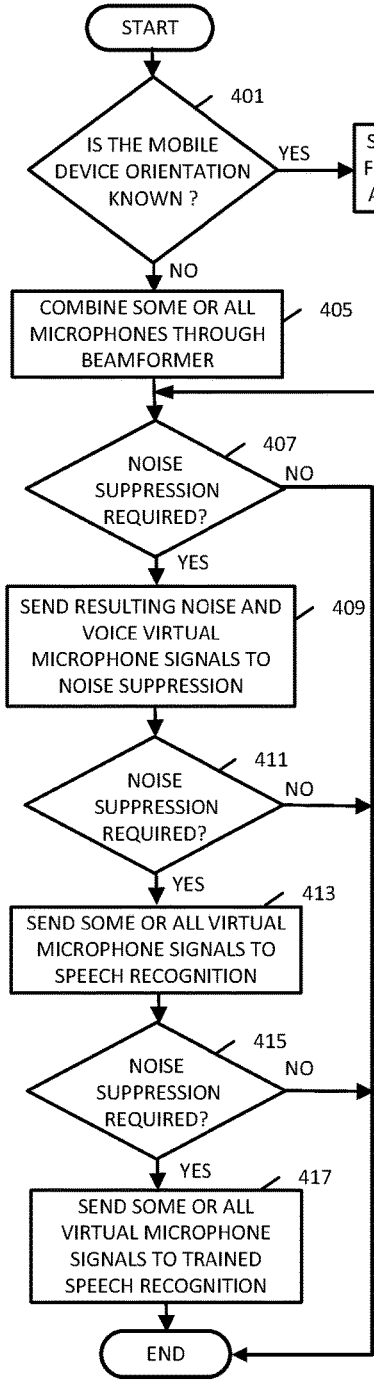
FIG. 4 is a flow chart showing an example method of operation related to formation of a virtual microphone to obtain a voice signal in accordance with various embodiments.

In some embodiments, the method of operation illustrated in FIG. 4 may be truncated by omitting operation block 413 and decision block 415 and proceeding from decision block 411 directly to operation block 417. In other words, in some embodiments only the trained speech recognition logic SI-VR 182 is utilized in an attempt to identify the presence of the user's voice in the voice signal. Also, as discussed above with respect to FIG. 2, the trained speech recognition logic SI-VR 182 may also be applied to the noise signal to verify that any voice present in the noise signal is mostly jammer voices and not the user's voice.

Figure 5:
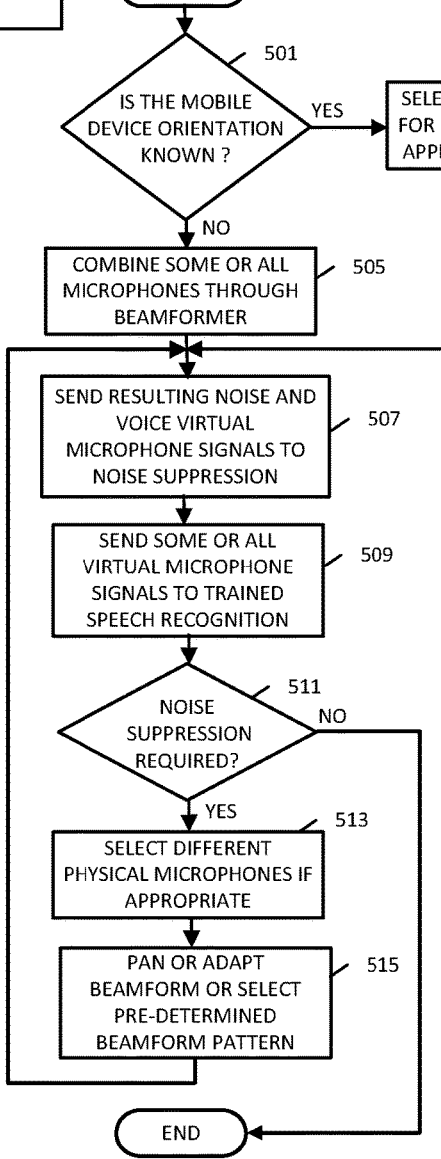
FIG. 5 is a flow chart showing another example method of operation related to formation of a virtual microphone to obtain a voice signal in accordance with various embodiments.

FIG. 5 is a flow chart showing another example method of operation related to formation of a virtual microphone and related beamform to obtain a voice signal in accordance with various embodiments. Decision block 501, operation block 503 and operation block 505 involve operations similar to operation blocks 401, 403 and 405 of FIG. 4 and therefore need not be discussed here in detail. Therefore the method of operation proceeds to operation block 507, in which the noise and voice virtual microphone signals are immediately sent to noise suppressor 170. The resulting noise suppressed voice signal 157 is sent to the SI-VR 182 logic in operation block 509. The beamformer controller 190 accordingly receives the voice confidence metrics 159 and determines if further noise suppression is required as shown in decision block 511. If the voice confidence metrics are sufficiently high then the method of operation ends and the voice beamform can be considered adequate. However, if the voice confidence metrics 159 are too low, then this indicates that further noise suppression would be required. The method of operation therefore proceeds to operation block 513. In operation block 513 the beamformer controller sends control signal 194 to the microphone configuration logic 120 and selects a different set of physical microphones from the group of microphones 110 if appropriate. That is, all microphones may already be in use after operation block 503 or operation block 505. In operation block 515, the beamformer controller 190 sends control signal 195 to the beamformer 132 and pans or adapts the beamform or may select a predetermined beamform pattern from system memory 103 in the stored predetermined beamform patterns database 191. This is done in an attempt to steer the peak in sensitivity of the beam toward another location where voice may be detected. Therefore after operation block 515, the method of operation loops back to operation block 507 and the method of operation repeats as shown until success.

Figures 6, 7:
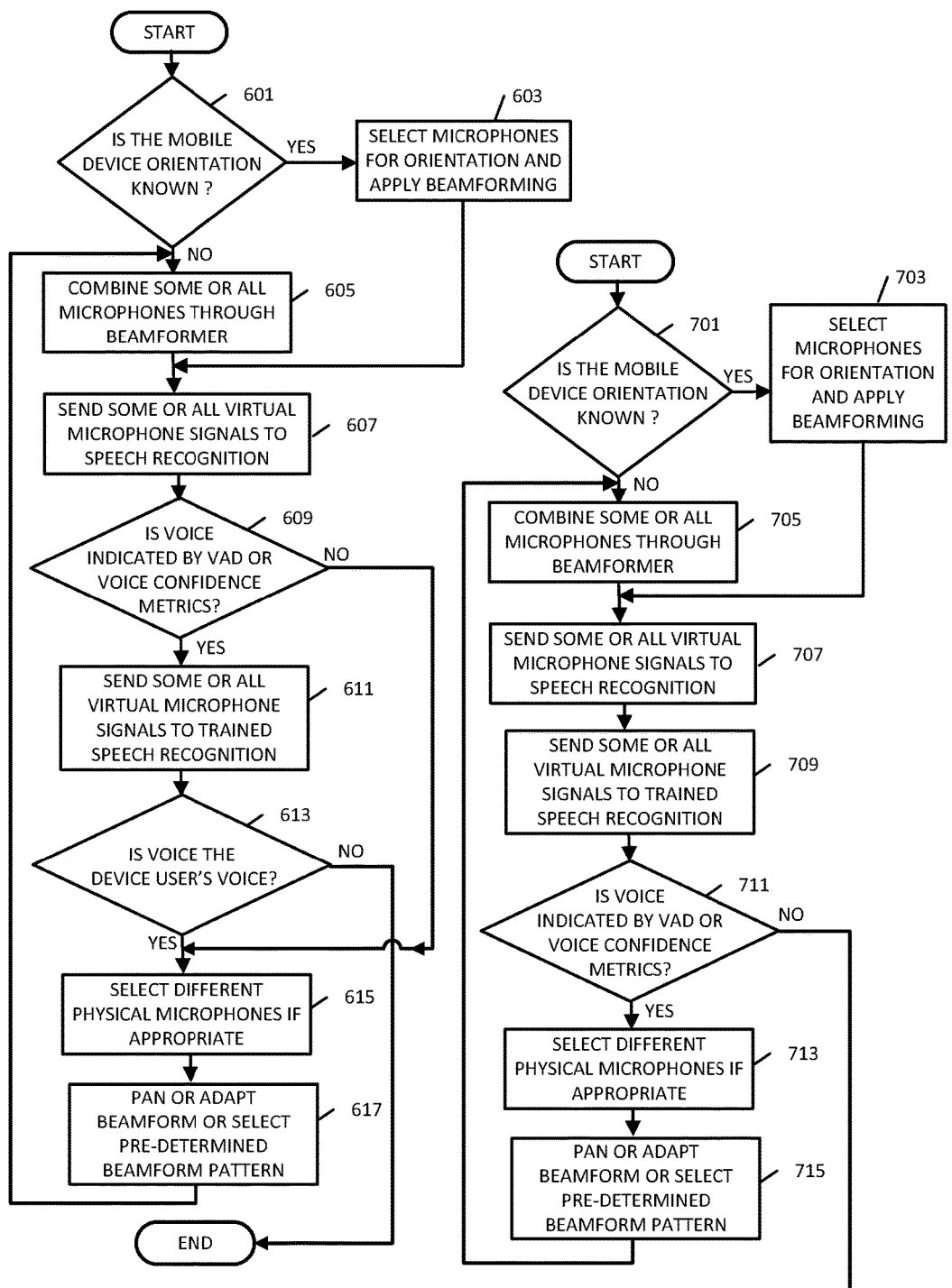
FIG. 6 is a flow chart showing an example method of operation related to formation of a virtual microphone to obtain a noise signal with a jamming voice in accordance with various embodiments.
FIG. 7 is a flow chart showing another example method of operation related to formation of a virtual microphone to obtain a noise signal in accordance with various embodiments.

FIG. 6 is a flow chart showing an example method of operation related to formation of a virtual microphone and related beamform to obtain a noise signal with a jamming voice in accordance with various embodiments. Operation blocks 601, 603 and 605 are again related to determining a mobile device orientation and have previously been discussed with respect to FIG. 4 and therefore need not be discussed in detail here. The method of operation proceeds to operation block 607, in which some or all of the virtual microphone signals are sent to speech recognition directly. Therefore beamformer controller 190 may send control signal 163 to the voice recognition engine 180 to instruct the voice recognition engine 180 to read the buffered noise signal 117. In decision block 609, the beamformer controller 190 checks the voice confidence metrics 159 to determine if voice appears to be present in any of the signals. Additionally, the beamformer controller 190 may check control signal 125 from VAD 152 to determine if voice activity detection has determined that voice may be present. If voice appears to be present in decision block 609, then the method of operation proceeds to operation block 611 and sends the signal to SI-VR 182 logic. If the user's voice is not detected in decision block 613, based on sufficiently low voice confidence metrics 159, the method of operation ends as shown. However if the voice confidence metrics 159 are high such that the user's voice is likely present, then the method of operation proceeds to operation block 615 in which a different set of physical microphones may be selected if appropriate as was described above, that is, assuming that additional microphones are available (i.e. in situations where only some of the available microphones were initially employed). In operation block 617, the beamformer controller 190 again controls the beamformer 132 to pan or adapt the beamform or selects a predetermined beamformer pattern in order to continue the search for a jammer voice.

FIG. 7 is a flow chart showing another example method of operation related to formation of a virtual microphone and related beamform to obtain a noise signal in accordance with various embodiments. Decision block 701 and operation block 703 and 705 are again similar to other flowcharts in that they are related to determining the orientation of a mobile device and therefore will not be discussed in detail here. The method of operation proceeds to operation block 707 where some or all virtual microphone signals are sent directly to speech recognition, that is, to voice recognition engine 180. In operation block 709, some or all of the virtual microphone signals are also sent to the SI-VR logic 182. In decision block 711, voice activity detectors are checked along with the voice confidence metrics 159 to determine if any of the signals contain voice. If not, then the beamform can be considered to have successfully formed a beam that adequately captures the environmental noise and the method of operation ends as shown. However if voice is detected in decision block 711, then the method of operation proceeds to operation block 713 and a different set of physical microphones is selected if appropriate. In operation block 715, the beamformer controller 190 controls the beamformer 131 and pans or adapts the beamformer, or selects a predetermined beamform pattern from the database of beamformer patterns database 191 stored system memory 103. The method of operation then loops back to operation block 705 and continues until a successful noise beam has been determined.

Figure 8:
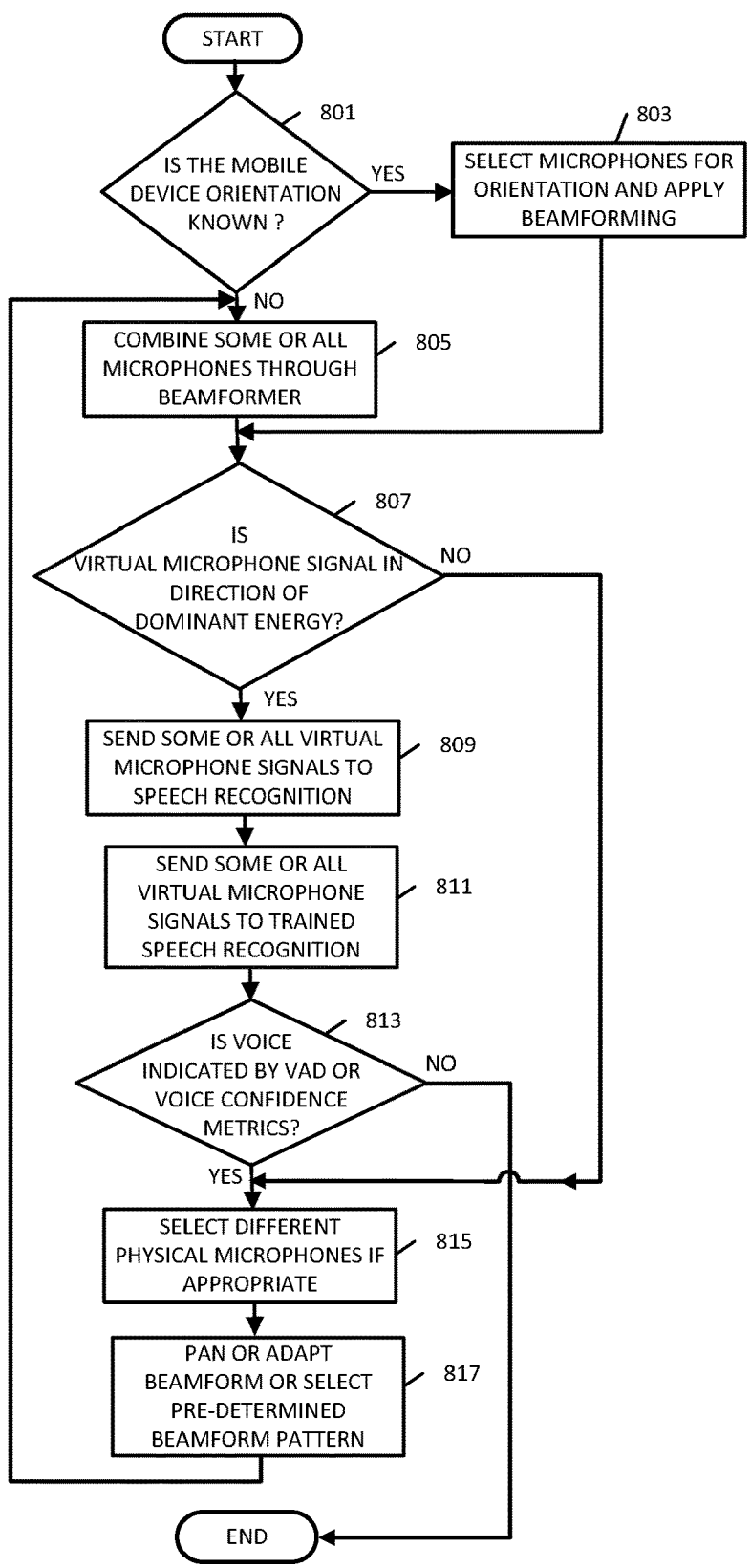
FIG. 8 is a flow chart showing another example method of operation related to formation of a virtual microphone to obtain a noise signal in accordance with various embodiments.

FIG. 8 is a flow chart showing another example method of operation related to formation of a virtual microphone and related beamform to obtain a noise signal in accordance with various embodiments. Decision block 801 and operation block 803 and operation block 805 are again related to determination of the orientation of a mobile device and will not be discussed herein in detail. The method of operation proceeds to decision block 807 in which the energy estimators are checked to determine whether the virtual microphone signal is in the direction of a dominant energy. If not, the method of operation then proceeds to operation block 815 and may select a different set of physical microphones of the group of microphones 110 if appropriate, that is, assuming that additional microphones are available (i.e. in situations where only some of the available microphones were initially or previously employed). In operation block 817, beamformer controller 190 controls the beamformer 132 to pan or adapt the beamform or selects a predetermined beamform pattern as discussed above, and the method of operation loops back to operation block 805 and continues to search for the noise beam. If the energy estimator determines that the dominant energy source is found in decision block 807, then the method of operation proceeds to operation block 809 where some or all of the virtual microphone signals are sent to the voice recognition engine 180. In operation block 811, some or all of the virtual microphone signals are also sent to the SI-VR logic 182. In decision block 813, if voice is indicated by either the voice activity detector VAD 152, or the voice confidence metrics 159, then the method of operation again proceeds to operation block 815 where a different set of physical microphones may be selected in some situations as discussed above, etc., and in block 817 the beamformer may pan or adapt in the continued search for an environmental noise source. Whenever voice is not indicated in decision block 813, then the beamform can be considered to have successfully captured the environmental noise and the method of operation ends as shown. The noise estimator 162 can send control signal 153 to the noise suppressor 170 when the voice signal and noise signal are to both be sent to the noise suppressor 170. The noise estimator 162 receives control signal 143 from VAD 152.

Thus, in view of the embodiments described in detail above with respect to FIG. 1 and the flowcharts of FIG. 2 through FIG. 8, it is to be understood that various combinations of the components shown in FIG. 1 such as the energy estimators, VADs, noise estimators, voice recognition or speaker identification voice recognition may be used to obtain the features and advantages provided by the present disclosure and that such various combinations are contemplated by the disclosure herein. Also it is to be understood that, in some embodiments, some of the aforementioned components may not be used or may not be present in any particular embodiment. In one example, if VAD is used to detect voice in the voice channel or the noise channel, the voice recognition engine 180 may not be used or may not be present in that embodiment. In another example, if voice recognition is used to detect voice in the voice signal or the noise signal, the VAD 151 or VAD 152 may not be used or may not be present in that embodiment. In either of the above two examples, the energy estimator 141 and energy estimator 142 may not be used or may not be present in either example embodiment. Therefore, based on the description of the embodiments and various examples provide above herein, one of ordinary skill will understand that FIG. 1 contemplates all such various embodiments in view of the present disclosure. Other such contemplated embodiment examples therefore will become apparent to one of ordinary skill in light of the examples and disclosure provided herein.

It is to be understood that the various components, circuitry, devices etc. described with respect to FIG. 1 and the various flowcharts including, but not limited to, those described using the term "logic," such as the microphone configuration logic 120, beamformers 130, buffers 133 and 134, energy estimators 141 and 142, VAD 151 and 152, noise estimators 161 and 162, noise suppressor 170, voice recognition engine 180, beamformer controller 190, or system control 101 may be implemented in various ways such as by software and/or firmware executing on one or more programmable processors such as a central processing unit (CPU) or the like, or by ASICs, DSPs, FPGAs, hardwired circuitry (logic circuitry), or any combinations thereof.

Also, it is to be understood that the various "control signals" described herein with respect to FIG. 1 and the various aforementioned components, may be implemented in various ways such as using application programming interfaces (APIs) between the various components. Therefore, in some embodiments, components may be operatively coupled using APIs rather than a hardware communication bus if such components are implemented as by software and/or firmware executing on one or more programmable processors. For example, the beamformer controller 190 and the noise suppressor 170 may be software and/or firmware executing on a single processor and may communicate and interact with each other using APIs. In another example, the beamformers 130 and the beamformer controller 190 may be software and/or firmware executing on a single processor and may communicate and interact with each other using APIs. Additional similar examples will be apparent to those of ordinary skill in light of the examples and description provide herein.

Additionally, operations involving the system memory 103 may be implemented using pointers where the components such as, but not limited to, the beamformer controller 190 or the noise suppressor 170, access the system memory 103 as directed by control signals which may include pointers to memory locations or database access commands that access the pre-determined beamform patterns database 191 or the database of noise suppression algorithms 171 or etc., respectively.

It is to be understood that various applications can benefit from the disclosed embodiments, in additions to devices and systems using voice recognition control. For example, the beamforming methods of operations disclosed herein may be used to determine a voice and noise signal for the purpose of identifying a user for a voice uplink channel of a mobile telephone and/or for applying dual or multi-input noise suppression for a voice uplink channel of a mobile telephone. In another example application, a stationary conference call system may incorporate the apparatuses and methods herein described. Other applications of the various disclosed embodiments will be apparent to those of ordinary skill in light of the description and various example embodiments herein described.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus comprising:
 a first voice activity detector, the first voice activity detector configured to generate, based on a voice signal, a first voice control signal to indicate whether a voice is detected in the voice signal;

a first noise estimator, the first noise estimator configured to generate, based on a noise level of the voice signal, a first noise control signal to indicate whether to apply noise suppression for the voice signal;

a second voice activity detector, the second voice activity detector configured to generate, based on a noise signal, a second voice control signal to indicate whether another voice is detected in the noise signal;

a second noise estimator, the second noise estimator configured to generate, based on another noise level of the noise signal, a second noise control signal to indicate whether to apply noise suppression for the noise signal; and a beamformer controller coupled to the first voice activity detector, the first noise estimator, the second voice activity detector, and the second noise estimator, the beamformer controller configured to:

adjust, based on the first voice control signal and the first noise control signal, a voice beamform pattern effective to cause the voice to be substantially present in the voice signal;

adjust, based on the second voice control signal and the second noise control signal, a noise beamform pattern effective to cause noise to be substantially present in the noise signal; and generate, based on the first noise control signal and the second noise control signal, a noise suppression control signal to control noise suppression for the voice signal and the noise signal.

2. The apparatus of claim 1, wherein the beamformer controller is configured to generate, based on the first voice control signal and the second voice control signal, a voice recognition control signal to control voice recognition and speaker identification for the voice signal and the noise signal.

3. The apparatus of claim 2, further comprising:

a voice recognition engine coupled to the beamformer controller, the voice recognition engine configured to:

detect whether the voice in the voice signal and the other voice in the noise signal are present;

responsive to detecting the voice and the other voice, determine whether the voice in the voice signal and the other voice in the noise signal are associated with a same speaker; and generate, based on the voice recognition control signal, at least one voice confidence metric that is associated with the detection and the determination, and wherein:

the beamformer controller is further configured to:

adjust the voice beamform pattern and the noise beamform pattern based on that at least one voice confidence metric; and generate the noise suppression control signal based on the at least one voice confidence metric.

4. The apparatus of claim 1, further comprising:

a group of microphones having an orientation;

an orientation sensor coupled to the beamformer controller, the orientation sensor configured to determine the orientation of the group of microphones, and wherein:

the beamformer controller is further configured to adjust the voice beamform pattern and the noise beamform pattern based on the orientation of the group of microphones.

5. The apparatus of claim 4, wherein:

the orientation of the group of microphones corresponds to a tabletop orientation in which a side of the apparatus is placed on a tabletop; and the beamformer controller is further configured to adjust the voice beamform pattern and the noise beamform pattern based on a pre-determined microphone configuration associated with the tabletop orientation.

6. The apparatus of claim 4, wherein:

the orientation of the group of microphones corresponds to a docking station orientation in which the apparatus is placed in a docking station; and the beamformer controller is further configured to adjust the voice beamform pattern and the noise beamform pattern based on a pre-determined microphone configuration associated with the docking station orientation.

7. The apparatus of claim 1, wherein:

the adjusting of the voice beamform pattern by the beamformer controller is effective to steer a peak of the voice beamform pattern in a direction of the voice; and the adjusting of the noise beamform pattern by the beamformer controller is effective to steer a null of the noise beamform pattern in the direction of the voice.

8. The apparatus of claim 1, wherein the noise includes a jammer voice that is not associated with the voice in the voice signal.

9. The apparatus of claim 1, wherein the noise includes environmental background noise.

10. The apparatus of claim 1, wherein the beamformer controller is configured to adjust the voice beamform pattern based on a random set of voice beamform patterns.

11. The apparatus of claim 1, wherein the beamformer controller is configured to scan the voice beamform pattern until the voice is detected in the voice signal by the first voice activity detector.

12. A method comprising:

generating at least two voice control signals that respectively indicate whether a voice is present in a voice signal and another voice is present in a noise signal;

generating at least two noise control signals that indicate whether to apply noise suppression based on a noise level of the voice signal and another noise level of the noise signal, respectively;

adjusting, based on the at least two voice control signals and the at least two noise control signals, a voice beamform pattern effective to cause the voice to be substantially present in the voice signal and a noise beamform pattern effective to cause noise to be substantially present in the noise signal; and generating, based on the at least two noise control signals, a noise suppression control signal to activate noise suppression for the voice signal and the noise signal.

13. The method of claim 12, further comprising responsive to the at least two voice control signals indicating a presence of the voice in the voice signal and the other voice in the noise signal, determining whether the voice in the voice signal and the other voice in the noise signal are associated with a same speaker.

14. The method of claim 13, wherein adjusting the voice beamform pattern and the noise beamform pattern is effective to provide higher voice confidence metrics associated with detecting the voice and the other voice and determining whether the voice and the other voice are associated with the same speaker.

15. The method of claim 13, wherein:

the voice in the voice signal and the other voice in the noise signal are determined to be associated with the same speaker; and adjusting the noise beamform pattern comprises adjusting the noise beamform pattern effective to cause the other voice to not be substantially present in the noise signal.

16. The method of claim 13, wherein:
the voice in the voice signal and the other voice in the noise signal are associated with different speakers;
adjusting the voice beamform pattern comprises adjusting a null of the voice beamform pattern in a direction of the other voice; and
adjusting the noise beamform pattern comprises adjusting a peak of the noise beamform pattern in the direction of the other voice.

17. The method of claim 12, further comprising:
determining an orientation of a group of microphones that produce the voice beamform pattern and the noise beamform pattern; and
adjusting the voice beamform pattern and the noise beamform pattern based on the orientation of the group of microphones.

18. A beamformer controller coupled to a first voice activity detector of a voice channel, a first noise estimator of the voice channel, a second voice activity detector of a noise channel, a second noise estimator of the noise channel, a noise suppressor, a voice recognition engine, a voice beamformer, and a noise beamformer, the beamformer controller configured to:
receive, from the first voice activity detector, a first voice control signal that indicates whether a voice is detected in a voice signal;
receive, from the first noise estimator, a first noise control signal that indicates a noise level of the voice signal;
receive, from the second voice activity detector, a second voice control signal that indicates whether another voice is detected in a noise signal;
receive, from the second noise estimator, a second noise control signal that indicates another noise level of the noise signal;
adjust, based on the first voice control signal and the first noise control signal, a voice beamform pattern for the voice signal via the voice beamformer;
adjust, based on the second voice control signal and the second noise control signal, a noise beamform pattern for the noise signal via the noise beamformer;
generate, based on the first noise control signal and the second noise control signal, a noise suppression control signal to control whether the noise suppressor is to perform noise suppression using the voice signal and the noise signal; and
generate a voice recognition control signal based on the first voice control signal and the second voice control signal to control whether the voice recognition engine is to perform voice recognition for the voice signal and the noise signal.

19. The beamformer controller of claim 18, wherein the adjusting of the voice beamform pattern, the adjusting of the noise beamform pattern, the generating of the noise suppression control signal, and the generating of the voice recognition control signal are effective to enable the beamformer controller to respond to a dynamic acoustic environment that changes based on orientation of a group of microphones, motion of the group of microphones, and environmental noise.

20. The beamformer controller of claim 18, further configured to:
receive, from a first energy estimator, a first energy control signal that indicates an energy level of the voice signal;
receive, from a second energy estimator, a second energy control signal that indicates another energy level of the noise signal;
adjust a directivity of the voice beamformer based on the energy level of the voice signal; and
adjust another directivity of the noise beamformer based on the other energy level of the noise signal.

* * * * *